United States Patent
Tenno

(10) Patent No.: US 10,522,911 B2
(45) Date of Patent: Dec. 31, 2019

(54) ANTENNA DEVICE, CARD-TYPE INFORMATION MEDIUM, AND COMMUNICATION TERMINAL APPARATUS

(71) Applicant: Murata Manufacturing Co., Ltd., Nagaokakyo-shi, Kyoto-fu (JP)

(72) Inventor: Nobuyuki Tenno, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 314 days.

(21) Appl. No.: 15/581,139

(22) Filed: Apr. 28, 2017

(65) Prior Publication Data

US 2017/0229778 A1    Aug. 10, 2017

Related U.S. Application Data

(63) Continuation of application No. PCT/JP2016/050897, filed on Jan. 14, 2016.

(30) Foreign Application Priority Data

Jan. 29, 2015 (JP) .................................. 2015-016049

(51) Int. Cl.
  *H01Q 7/06*        (2006.01)
  *G06K 19/077*      (2006.01)
  *H01Q 1/24*        (2006.01)

(52) U.S. Cl.
  CPC ......... *H01Q 7/06* (2013.01); *G06K 19/07783* (2013.01); *H01Q 1/243* (2013.01)

(58) Field of Classification Search
  CPC ...... G06K 7/10356; H01Q 7/00; H01Q 7/005; H01Q 7/02; H01Q 7/04; H01Q 7/06; H01Q 7/08; H01Q 1/2225; H01Q 1/2233
  See application file for complete search history.

(56) References Cited

U.S. PATENT DOCUMENTS

2002/0044102 A1*  4/2002  Yokoshima ............ H01Q 1/243
                                                     343/895
2008/0238803 A1* 10/2008  Yang ...................... H01Q 1/243
                                                     343/848
(Continued)

FOREIGN PATENT DOCUMENTS

JP        11-328341 A      11/1999
JP        2014-161003 A     9/2014
(Continued)

OTHER PUBLICATIONS

Official Communication issued in International Patent Application No. PCT/JP2016/050897, dated Mar. 15, 2016.

*Primary Examiner* — Daniel Munoz
(74) *Attorney, Agent, or Firm* — Keating & Bennett, LLP

(57) ABSTRACT

An antenna device includes a coil antenna including coil conductors that are wound around a winding axis and include a first coil end and a second coil end, a first planar conductor, a second planar conductor, and a third planar conductor. The first planar conductor includes a surface extending along the winding axis in proximity to the first coil end. The second planar conductor includes a surface extending along the winding axis is in proximity to the second coil end. The third planar conductor is in proximity to the first planar conductor and to the second planar conductor, with at least a portion of the third planar conductor being positioned between the first planar conductor and the second planar conductor in plan view.

11 Claims, 14 Drawing Sheets

(56) References Cited

U.S. PATENT DOCUMENTS

2013/0181876 A1    7/2013   Miura et al.
2014/0043196 A1    2/2014   Gouchi et al.
2016/0020517 A1    1/2016   Florek et al.

FOREIGN PATENT DOCUMENTS

WO     2012/033031 A1    3/2012
WO     2014/076669 A1    5/2014

\* cited by examiner

ANTENNA DEVICE, CARD-TYPE INFORMATION MEDIUM, AND COMMUNICATION TERMINAL APPARATUS

CROSS REFERENCE TO RELATED APPLICATIONS

This application claims the benefit of priority to Japanese Patent Application No. 2015-016049 filed on Jan. 29, 2015 and is a Continuation Application of PCT Application No. PCT/JP2016/050897 filed on Jan. 14, 2016. The entire contents of each application are hereby incorporated herein by reference.

BACKGROUND OF THE INVENTION

1. Field of the Invention

The present invention relates to an antenna device, a card-type information medium, and a communication terminal apparatus.

2. Description of the Related Art

Some recent communication terminal apparatuses, such as cellular phones use RFID (Radio Frequency Identification) systems, so that the communication terminal apparatuses can be used as reader-writers or RFID tags. In a system that uses an HF communication band, the communication range between antenna devices depends on magnetic flux passing through coil antennas. That is, to provide a substantial communication range between antenna devices, the sizes of their coil antennas need to be large. However, increasing the sizes of coil antennas hinders the size reduction of communication terminal apparatuses. Thus, a technique of providing an RFID function to a communication terminal apparatus, such as a cellular phone, has been proposed in which a predetermined communication range is provided with a coil antenna occupying a reduced area.

An invention disclosed in International Publication No. WO 2012/033031 relates to an antenna device providing a predetermined communication range with a coil antenna thereof occupying a reduced area.

FIG. 14 is a sectional view of the antenna device disclosed in International Publication No. WO 2012/033031. In FIG. 14, an antenna device 211 includes an antenna coil 100 including a coil conductor 22 wound around an insulator core 21, and two planar conductors 11A and 11B each including a surface extending along the winding axis of the coil conductor 22, with an edge portion of each of the planar conductors 11A and 11B being in proximity (adjacent) to a corresponding one of two coil openings of the coil conductor 22. The two planar conductors 11A and 11B function as booster antennas for the antenna coil 100 by an effect of magnetic-field coupling to the antenna coil 100. Thus, despite the small size of the antenna coil, the antenna device has electrical characteristics that are substantially the same as or superior to electrical characteristics of a large-sized antenna coil.

In the configuration disclosed in International Publication No. WO 2012/033031, since the two planar conductors are positioned in proximity to each other, the two planar conductors are electromagnetically coupled to each other, such that induced currents generated in the respective planar conductors cancel each other out. Therefore, the functions of the two planar conductors as booster antennas are deteriorated, and the allowable communication range is thus narrowed.

If the two planar conductors are not in proximity to each other, a wide air gap is provided between the planar conductors. Therefore, magnetic flux from a major surface of one of the planar conductors runs through the air gap and enters the other major surface of that planar conductor, forming a small loop. Such magnetic flux forming a small loop provides substantially no contribution to the communication between antenna devices. Therefore, the functions of the booster antennas are deteriorated, and the allowable communication range is thus narrowed.

SUMMARY OF THE INVENTION

Preferred embodiments of the present invention provide an antenna device including planar conductors (booster antennas) in which deterioration in the functions of the booster antennas is reduced or prevented while a wide allowable communication range is provided. Preferred embodiments of the present invention also provide a card-type information medium and a communication terminal apparatus each including the antenna device.

An antenna device according to a preferred embodiment of the present invention includes a coil antenna including a coil conductor that is wound around a winding axis and includes a first coil end and a second coil end, a first planar conductor including a surface extending along the winding axis, the first planar conductor being in proximity to the first coil end, a second planar conductor including a surface extending along the winding axis, the second planar conductor being in proximity to the second coil end, and a third planar conductor provided in proximity to the first planar conductor and to the second planar conductor, with at least a portion of the third planar conductor being positioned between the first planar conductor and the second planar conductor in plan view.

With this configuration, since the first planar conductor and the second planar conductor that define and function as booster antennas for the coil antenna are provided, a coil opening that defines and functions as an antenna is larger than in a case where only the coil antenna is provided. Thus, the degree of coupling to an antenna coil of a communication counterpart is increased. Furthermore, since the first planar conductor and the second planar conductor are not in proximity to each other, magnetic flux generated in the first planar conductor and magnetic flux generated in the second planar conductor produce a large loop. Consequently, a wide allowable communication range is provided.

Furthermore, since the third planar conductor is provided between the first planar conductor and the second planar conductor, generation of magnetic flux passing through the gap between the first planar conductor and the second planar conductor and producing a small loop is reduced or prevented. Specifically, generation of magnetic flux leaving one of the major surfaces of the first planar conductor and entering the other major surface of the first planar conductor is prevented, and generation of magnetic flux leaving one of major surfaces of the second planar conductor and entering the other major surface of the second planar conductor is significantly reduced or prevented. Since generation of small loops of magnetic flux that provide substantially no contribution to communication is reduced or prevented, deterioration in the functions of the first planar conductor and the second planar conductor as booster antennas is also reduced or prevented. Consequently, a wide allowable communication range is provided.

It is preferable that the first planar conductor, the second planar conductor, and the third planar conductor extend in substantially one specific plane. With such a configuration, the first planar conductor, the second planar conductor, and the third planar conductor are able to be obtained easily as conductor patterns provided on one substrate such as a printed circuit board. Furthermore, since no additional planar conductors are necessary, the manufacturing process is simple and relatively inexpensive.

It is preferable that the first coil end be positioned in proximity to an edge portion of the first planar conductor in plan view. With such a configuration, the first coil end is in proximity (adjacent) to the edge portion of the first planar conductor where the density of currents generated is high because of an edge effect. Thus, the coil antenna and the first planar conductor undergo electromagnetic-field coupling with high efficiency. Therefore, the function of the first planar conductor as a booster antenna is improved, and the degree of coupling to an antenna coil of a communication counterpart is increased.

It is preferable that the second coil end be positioned in proximity to an edge portion of the second planar conductor in plan view. With such a configuration, the second coil end is in proximity (adjacent) to the edge portion of the second planar conductor where the density of currents generated is high because of an edge effect. Thus, the coil antenna and the second planar conductor undergo electromagnetic-field coupling with high efficiency. Therefore, the function of the second planar conductor as a booster antenna is improved, and the degree of coupling to an antenna coil of a communication counterpart is increased.

In the antenna device according to a preferred embodiment of the present invention, the third planar conductor may be one of a plurality of third planar conductors. With such a configuration, the number of air gaps provided between the first planar conductor and the second planar conductor increases. Alternatively, the region of each of the third planar conductors that is in proximity to (faces) the first planar conductor and the second planar conductor is short. Therefore, the occurrence of electromagnetic-field coupling between the first planar conductor and the second planar conductor with the aid of the third planar conductors is significantly reduced or prevented. Thus, the currents generated in the first planar conductor and in the second planar conductor are prevented from being cancelled out (reduced). Consequently, the deterioration in the functions of the first planar conductor and the second planar conductor as booster antennas is significantly reduced or prevented, and a wide allowable communication range is provided.

In the antenna device according to a preferred embodiment of the present invention, the coil antenna may be one of a plurality of coil antennas. With such a configuration, the total number of lines of magnetic flux generated from the coil antennas is greater than in a case in which only one coil antenna is provided. Accordingly, the function as a booster antenna is improved, and a wide allowable communication range is provided.

It is preferable that the plurality of coil antennas be positioned in proximity to the first planar conductor and be connected such that currents generated in the first planar conductor by an effect of electromagnetic-field coupling to the respective coil antennas are in phase with each other. With such a configuration, since the plurality of coil antennas are connected such that the currents generated in the first planar conductor by an effect of electromagnetic-field coupling are in phase with each other, the currents generated in the first planar conductor by an effect of electromagnetic-field coupling are superposed (added) together. Consequently, the function of the first planar conductor as a booster antenna is improved, and a wide allowable communication range is provided.

It is preferable that the plurality of coil antennas be positioned in proximity to the second planar conductor and be connected such that currents generated in the second planar conductor by an effect of electromagnetic-field coupling to the respective coil antennas are in phase with each other. With such a configuration, since the plurality of coil antennas are connected such that the currents generated in the second planar conductor by an effect of electromagnetic-field coupling are in phase with each other, the currents generated in the second planar conductor by an effect of electromagnetic-field coupling are superposed (added) together. Consequently, the function of the second planar conductor as a booster antenna is improved, and a wide allowable communication range is provided.

A card-type information medium according to a preferred embodiment of the present invention includes the antenna device according to a preferred embodiment of the present invention, and an external-connection electrode, wherein at least one of the first planar conductor, the second planar conductor, and the third planar conductor defines an external-connection conductor.

A communication terminal apparatus according to a preferred embodiment of the present invention includes the card-type information medium according to a preferred embodiment of the present invention, and a housing, wherein the card-type information medium is housed in the housing.

With this configuration, any apparatus not including a near-field radio-communication (NFC) system but including the card-type information medium is able to easily function as a communication terminal apparatus that is capable of near-field radio communication.

Since electrodes and other associated elements included in a SIM (a registered trademark) card are used, the first planar conductor, the second planar conductor, and the third planar conductor are able to be easily obtained. Moreover, since no additional planar conductors are necessary, the manufacturing process is simple and relatively inexpensive.

According to various preferred embodiments of the present invention, antenna devices including planar conductors (booster antennas) in which deterioration in the functions of the booster antennas is significantly reduced or prevented while a wide allowable communication range is provided, and card-type information media and communication terminal apparatuses each including the antenna device are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
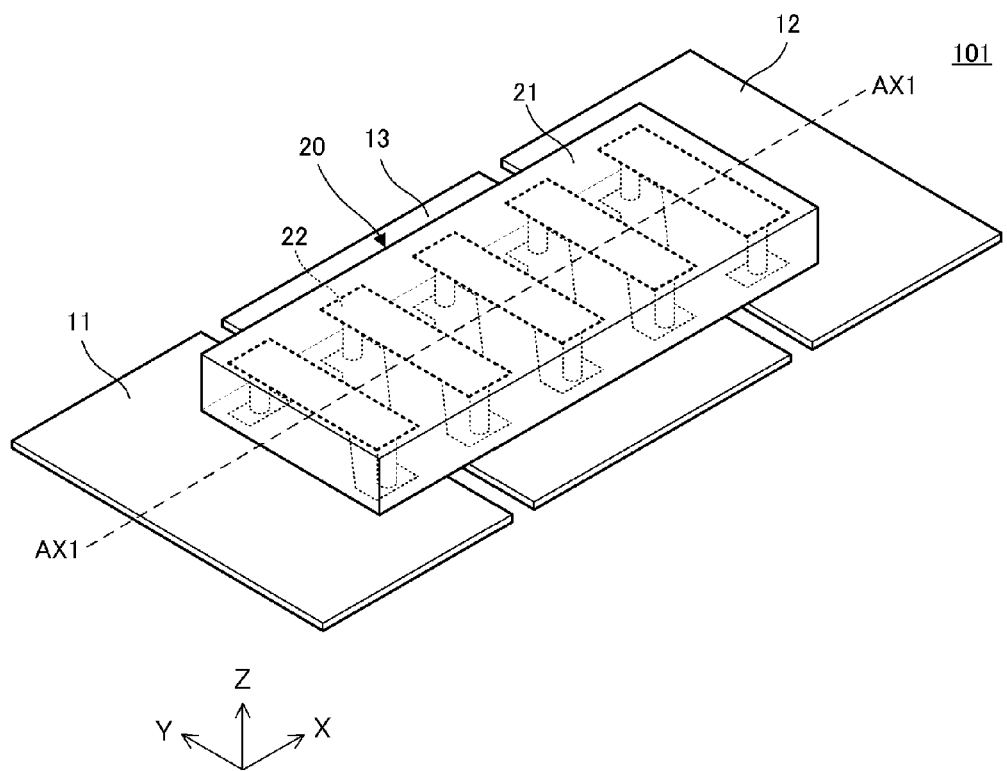
FIG. 1 is an external perspective view of an antenna device 101 according to a first preferred embodiment of the present invention.

Several preferred embodiments of the present invention will now be described with reference to the accompanying drawings. In the drawings, like reference numerals denote like elements. The preferred embodiments described below are only exemplary, and some elements included in any of the preferred embodiments are replaceable or combinable with other elements included in other preferred embodiments.

In the following preferred embodiments, the term "antenna device" refers to an antenna that radiates magnetic flux. The antenna device preferably is an antenna for near-field communication (NFC), which is established by magnetic-field coupling, with an antenna of a communication counterpart. The antenna device is preferably used for communications such as NFC. The frequency at which the antenna device is used is preferably in, for example, an HF band: particularly 13.56 MHz or any frequency around 13.56 MHz. The size of the antenna device is very small relative to the wavelength λ at the frequency used and has poor characteristics in radiating electromagnetic waves in the frequency band used. The coil antenna included in the antenna device preferably has a size of about λ/10 or smaller, for example. Herein, the wavelength refers to an effective wavelength obtained taking into account the effect of shortening the wavelength with the dielectricity or the magnetic permeability of the base material of the antenna. Two ends of a plurality of coil conductors included in the coil antenna are connected to a feeder circuit that operates in the frequency band used (an HF band: particularly, 13.56 MHz or any frequency around 13.56 MHz).

First Preferred Embodiment

Figure 2A:
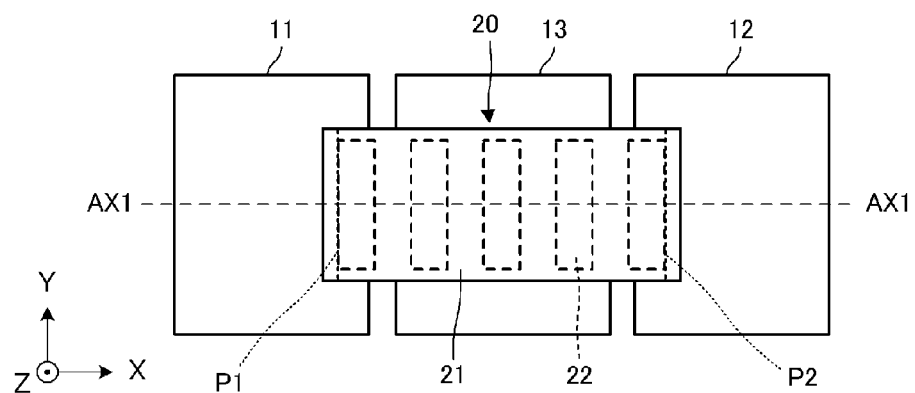
FIG. 2A is a plan view of the antenna device 101.
Figure 2B:
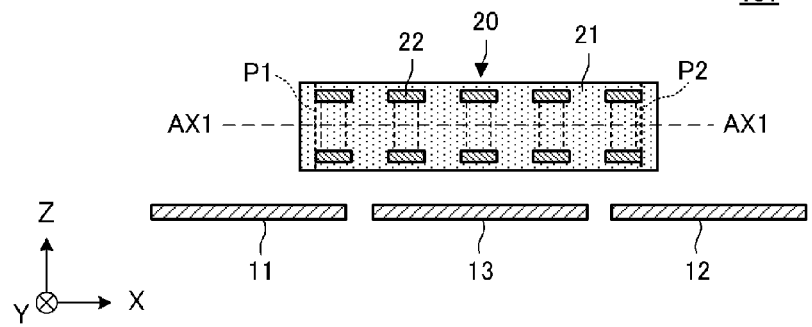
FIG. 2B is a sectional view of the antenna device 101.

FIG. 1 is an external perspective view of an antenna device 101 according to a first preferred embodiment of the present invention. FIG. 2A is a plan view of the antenna device 101. FIG. 2B is a sectional view of the antenna device 101.

The antenna device 101 includes a coil antenna 20, a first planar conductor 11, and a second planar conductor 12.

The coil antenna 20 includes a rectangular-parallelepiped insulator core 21 and a plurality of coil conductors 22. A winding axis AX1 of the coil conductors 22 extends in the long-side direction of the insulator core 21. The insulator core 21 is preferably a ceramic body made of, for example, magnetic ferrite ceramic, or may be a ferrite-powdered resin layer obtained by dispersing magnetic ferrite powder into resin. The coil conductors 22 are each wound around the winding axis AX1. Each coil conductor 22 includes conductor patterns provided on two respective major surfaces of the insulator core 21 and extending in the short-side direction of the insulator core 21, and an interlayer connection conductor that connects the conductor patterns on the two major surfaces to each other in the height (Z) direction. The coil conductors 22 are preferably made of, for example, Ag or Cu. To enhance the mechanical strength of the coil antenna 20, nonmagnetic ferrite ceramic may be provided on an outer side of the coil conductors 22. The insulator core 21 may be a nonmagnetic body, instead of a magnetic body. However, if the insulator core 21 is a magnetic body, the antenna exhibits better characteristics.

The coil antenna 20 has a winding axis AX1 extending in the lateral (X) direction. The coil antenna 20 includes a first coil end P1 and a second coil end P2 in the direction of the winding axis AX1 of the coil conductors 22. The first coil end P1 and the second coil end P2 are two end portions (coil openings) of the plurality of coil conductors 22. If the insulator core 21 is a magnetic body and has high magnetic permeability (a relative magnetic permeability greater than 1), two end portions of the insulator core 21 in the direction of the winding axis AX1 may be regarded as the first coil end P1 and the second coil end P2, respectively.

The first planar conductor 11 preferably is a rectangular or substantially rectangular, conductive, thin metal plate. As illustrated in FIG. 2B, the first planar conductor 11 includes a surface extending along (parallel or substantially parallel to) the winding axis AX1 and is in proximity (adjacent) to the first coil end P1. The first planar conductor 11 is a preferably pattern formed by, for example, etching a sheet of Cu or Al foil and is provided on a substrate or other suitable structure that is not illustrated.

The second planar conductor 12 preferably is a rectangular or substantially rectangular, conductive, thin metal plate. As illustrated in FIG. 2B, the second planar conductor 12 includes a surface extending along (parallel or substantially parallel to) the winding axis AX1 and is in proximity (adjacent) to the second coil end P2. The second planar conductor 12 is preferably a pattern formed by, for example, etching a sheet of Cu or Al foil and is provided on a substrate or the like that is not illustrated.

A third planar conductor 13 preferably is a rectangular or substantially rectangular, conductive, thin metal plate. As illustrated in FIG. 2B, the third planar conductor 13 is in proximity (adjacent) to the first planar conductor 11 and to the second planar conductor 12. Furthermore, as illustrated in plan view in FIG. 2A, the third planar conductor 13 is positioned between the first planar conductor 11 and the second planar conductor 12. The third planar conductor 13 is preferably a pattern formed by, for example, etching a sheet of Cu or Al foil and is provided on a substrate or the like that is not illustrated.

The first coil end P1 of the coil antenna 20 is in proximity (adjacent) to an edge portion of the first planar conductor 11 (the right side of the first planar conductor 11 in FIG. 2A) in plan view. In plan view, at least a portion of at least one of the coil conductors 22 overlaps the first planar conductor 11.

The second coil end P2 of the coil antenna 20 is in proximity (adjacent) to an edge portion of the second planar conductor 12 (the left side of the second planar conductor 12 in FIG. 2A) in plan view. In plan view, at least a portion of at least one of the coil conductors 22 overlaps the second planar conductor 12.

In the antenna device 101 according to the first preferred embodiment, as illustrated in FIG. 2B, the first planar conductor 11, the second planar conductor 12, and the third planar conductor 13 extend in substantially one specific plane.

Figure 3A:
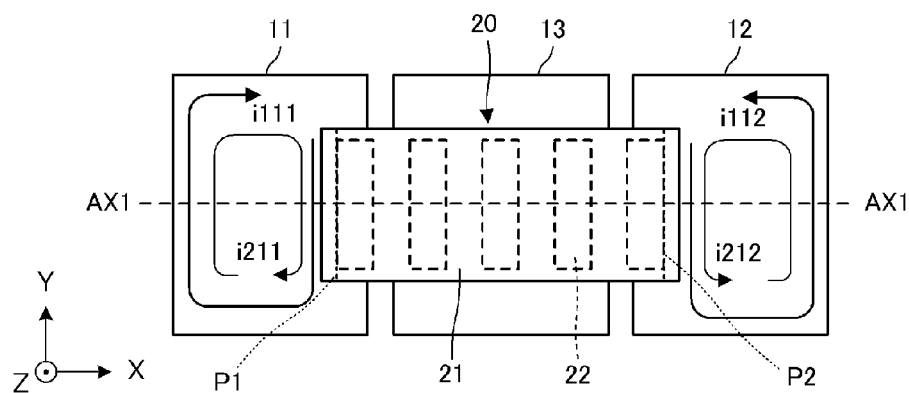
FIG. 3A is a plan view illustrating the relationship between currents flowing through a coil antenna 20 and currents generated in a first planar conductor 11 and in a second planar conductor 12.
Figure 3B:
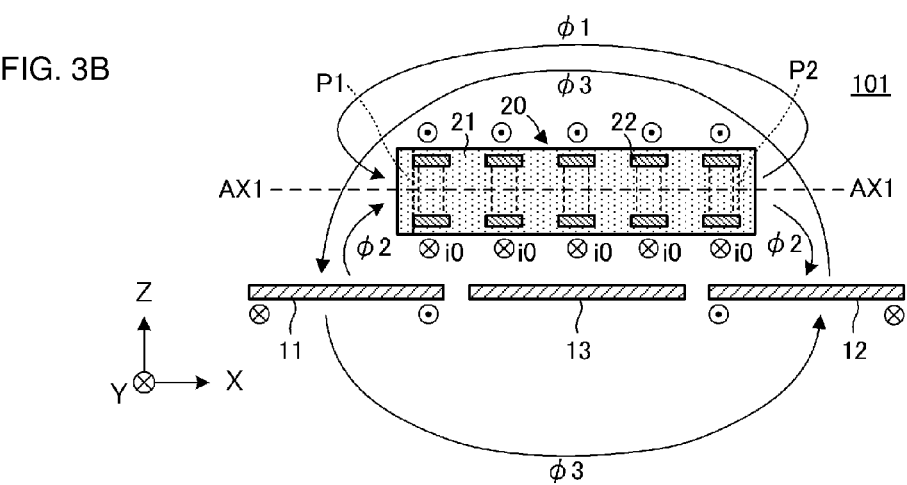
FIG. 3B is a sectional view of FIG. 3A.

FIG. 3A is a plan view illustrating the relationship between currents flowing through the coil antenna 20 and currents generated in the first planar conductor 11 and in the second planar conductor 12. FIG. 3B is a sectional view of FIG. 3A.

As illustrated in FIG. 3B, when currents i0 flow through the respective coil conductors 22 of the coil antenna 20, any of the currents i0 flowing through the coil conductors 22 induces a current i111 in the first planar conductor 11 by an effect of electromagnetic-field coupling (electric-field coupling and magnetic-field coupling). Specifically, in a region where any of the coil conductors 22 and the first planar conductor 11 are in proximity to each other, the corresponding current i0 induces, in the first planar conductor 11, the current i111 that flows in a direction (the clockwise direction in FIG. 3A) in which the current i0 is cancelled out. Meanwhile, any of the currents i0 flowing through the coil conductors 22 induces a current i112 in the second planar conductor 12 by an effect of electromagnetic-field coupling (electric-field coupling and magnetic-field coupling). Specifically, in a region where any of the coil conductors 22 and the second planar conductor 12 are in proximity to each other, the corresponding current i0 induces, in the second planar conductor 12, the current i112 that flows in a direction (the counterclockwise direction in FIG. 3A) in which the current i0 is cancelled out.

Furthermore, the currents i0 flowing through the coil conductors 22 generate a magnetic flux φ1 and a magnetic flux φ2. The magnetic flux φ1 leaves the second coil end P2, flows above the coil antenna 20 (on the upper side in FIG. 3B), and enters the first coil end P1. The magnetic flux φ2 includes magnetic flux leaving the second coil end P2 and entering the second planar conductor 12 and magnetic flux leaving the first planar conductor 11 and entering the first coil end P1.

As illustrated in FIG. 3A, the magnetic flux φ2 induces a current i211 in the first planar conductor 11 and a current i212 in the second planar conductor 12 by an effect of magnetic-field coupling. Specifically, the current i211 flows through the first planar conductor 11 in a direction (the clockwise direction in FIG. 3A) in which the magnetic flux φ2 is cancelled out, and the current i212 flows through the second planar conductor 12 in a direction (the counterclockwise direction in FIG. 3A) in which the magnetic flux φ2 is cancelled out.

The currents i111 and i211 generated in the first planar conductor 11 are in phase with each other and are superposed (added) together. That is, a current expressed by i111+i211 is generated in the first planar conductor 11. The currents i112 and i212 generated in the second planar conductor 12 are in phase with each other and are superposed (added) together. That is, a current expressed by i112+i212 is generated in the second planar conductor 12. Thus, the coil antenna 20 is coupled to the first planar conductor 11 and to the second planar conductor 12 with electromagnetic fields.

Accordingly, the first planar conductor 11 and the second planar conductor 12 define and function as booster antennas for the coil antenna 20. With the two booster antennas, a coil opening defining and functioning as an antenna is larger than in a case where only the coil antenna 20 is provided. Consequently, the degree of coupling to an antenna coil of a communication counterpart is increased.

As illustrated in FIG. 3B, the current (i111+i211) generated in the first planar conductor 11 and the current (i112+i212) generated in the second planar conductor 12 generate a magnetic flux φ3. The magnetic flux φ3 includes magnetic flux leaving one of the major surfaces (the lower surface in FIG. 3B) of the first planar conductor 11 and entering one of the major surfaces (the lower surface in FIG. 3B) of the second planar conductor 12, and magnetic flux leaving the other major surface (the upper surface in FIG. 3B) of the second planar conductor 12 and entering the other major surface (the upper surface in FIG. 3B) of the first planar conductor 11.

While the above example has been described as an operation of the antenna device 101 as an antenna on the transmitter side, the same applies to a case where the transmitter side and the receiver side are reversed, because of the reversibility (reciprocity theorem) of the antenna. That is, the above example also applies to a case where the antenna device 101 is an antenna on the receiver side.

In the antenna device 101 according to the first preferred embodiment, since the first planar conductor 11 and the second planar conductor 12 are not in proximity to each other, the magnetic flux φ3 generated by the first planar conductor 11 and the second planar conductor 12 produces a large loop. Furthermore, since the third planar conductor 13 is provided between the first planar conductor 11 and the second planar conductor 12 in plan view, the generation of magnetic flux producing a small loop between the first planar conductor 11 and the second planar conductor 12 is significantly reduced or prevented as described below.

Now, some specific comparative examples will be provided to explain the reason why the generation of magnetic flux producing a small loop between the first planar conductor 11 and the second planar conductor 12 is significantly reduced or prevented.

Figure 4A:
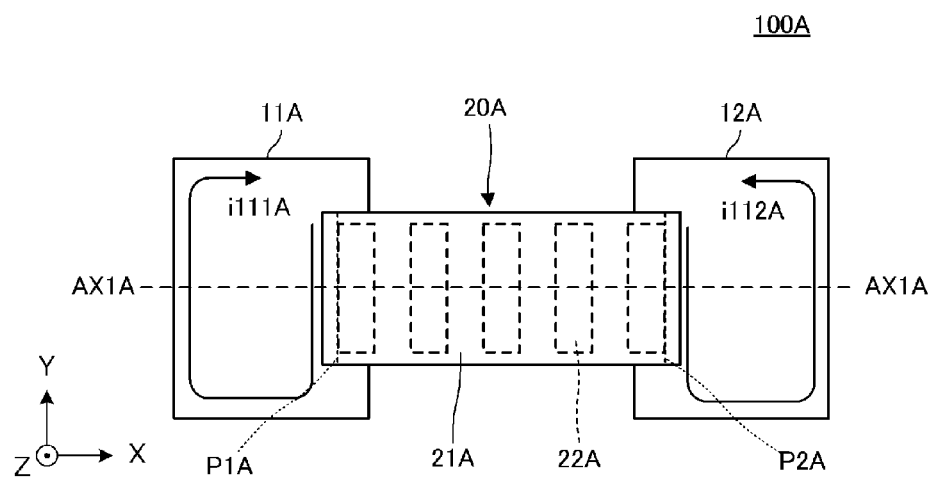
FIG. 4A is a plan view of an antenna device 100A according to a comparative example.
Figure 4B:
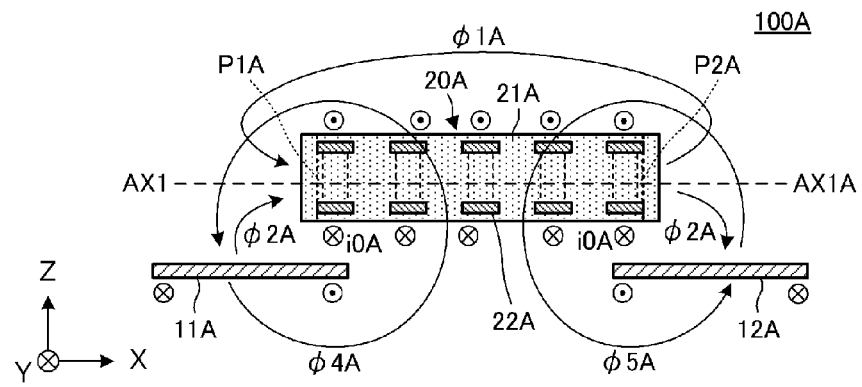
FIG. 4B is a sectional view of the antenna device 100A.

FIG. 4A is a plan view of an antenna device 100A according to a comparative example that does not include the third planar conductor 13. FIG. 4B is a sectional view of the antenna device 100A.

The antenna device 100A according to the comparative example differs from the antenna device 101 according to the first preferred embodiment in that no third planar conductor is included. The other details of the antenna device 100A are the same or substantially the same as those of the antenna device 101. Thus, the difference from the antenna device 101 will now be described.

The antenna device 100A includes a first planar conductor 11A and a second planar conductor 12A that are not in proximity to each other and does not include any third planar conductor. Thus, there is a large air gap between the first planar conductor 11A and the second planar conductor 12A.

Therefore, a magnetic flux φ4A leaving one of the major surfaces (the lower surface in FIG. 4B) of the first planar conductor 11A runs through the air gap and enters the other major surface (the upper surface in FIG. 4B) of the first planar conductor 11A, to produce a small loop. Meanwhile, a magnetic flux φ5A leaving one of the major surfaces (the upper surface in FIG. 4B) of the second planar conductor 12A runs through the air gap and enters the other major surface (the lower surface in FIG. 4B) of the second planar conductor 12A, to produce a small loop. Since such small loops provide substantially no contribution to the communication, the boost effect produced by the first planar conductor 11A and the second planar conductor 12A is small.

Figure 5A:
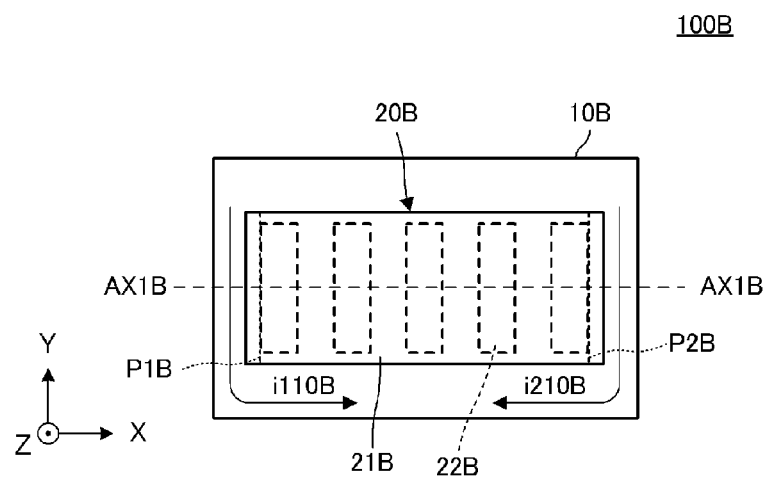
FIG. 5A is a plan view of an antenna device 100B according to another comparative example.
Figure 5B:
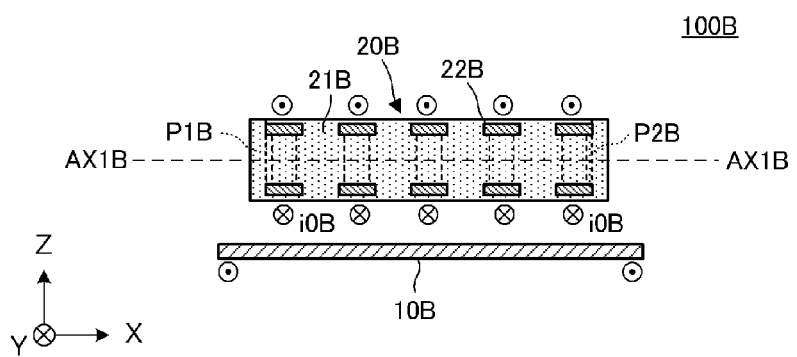
FIG. 5B is a sectional view of the antenna device 100B.

FIG. 5A is a plan view of an antenna device 100B according to another comparative example that does not include any third planar conductor. FIG. 5B is a sectional view of the antenna device 100B.

The antenna device 100B according to the comparative example includes neither the second planar conductor nor the third planar conductor but only one planar conductor 10B. Furthermore, a first coil end P1B and a second coil end P2B of a coil antenna 20B are positioned in proximity (adjacent) to respective edge portions of the planar conductor 10B in plan view. Now, the differences from the antenna device 101 will be described.

As illustrated in FIG. 5B, when currents i0B flow through respective coil conductors 22B of the coil antenna 20B, any of the currents i0B flowing through the coil conductors 22B induce currents i110B and i210B in the planar conductor 10B. More specifically, in a region where the coil conductor 22B at the first coil end P1B and the planar conductor 10B are in proximity to each other, the corresponding current i0B induces the current i110B in the planar conductor 10B that flows in a direction (the counterclockwise direction in FIG. 5A) in which the current i0B is cancelled out. Meanwhile, the corresponding current i0B flowing through the coil conductor 22B at the second coil end P2B induces the current i210B in the planar conductor 10B. Specifically, in each region where any of the coil conductors 22B and the planar conductor 10B are in proximity to each other, the corresponding current i0B induces in the planar conductor 10B the current i210B that flows in a direction (the clockwise direction in FIG. 5A) in which the current i0B is cancelled out.

The currents i110B and i210B generated in the planar conductor 10B are in opposite phase to each other and cancel each other out (are subtracted from each other), resulting in a current expressed by i110B-i210B flowing through the planar conductor 10B. That is, the function as a booster antenna is significantly deteriorated, and antenna characteristics are therefore degraded.

In contrast, according to the first preferred embodiment of the present invention, since the third planar conductor 13 is provided between the first planar conductor 11 and the second planar conductor 12, the generation of magnetic flux producing small loops between the first planar conductor 11 and the second planar conductor 12 is reduced or prevented. Specifically, the generation of the magnetic flux φ4A leaving the one major surface (the lower surface in FIG. 4B) of the first planar conductor 11 and entering the other major surface (the upper surface in FIG. 4B) of the first planar conductor 11 is reduced or prevented, and the generation of the magnetic flux φ5A leaving the one major surface (the upper surface in FIG. 4B) of the second planar conductor 12 and entering the other major surface (the lower surface in FIG. 4B) of the second planar conductor 12 is reduced or prevented.

Thus, the magnetic flux φ3 generated from the first planar conductor 11 and the second planar conductor 12 defining and functioning as booster antennas produce a large loop while the generation of the magnetic flux φ4A and φ5A is reduced or prevented. Consequently, the deterioration in the functions of the first planar conductor 11 and the second planar conductor 12 as booster antennas is reduced or prevented, and a wide allowable communication range is provided.

The antenna device 101 according to the first preferred embodiment has a structure such that the first coil end P1 is in proximity (adjacent) to the edge portion of the first planar conductor 11 where the density of currents generated is high because of an edge effect. Thus, the coil antenna 20 and the first planar conductor 11 undergo electromagnetic-field coupling with high efficiency. Therefore, the function of the first planar conductor 11 as a booster antenna is improved, and the degree of coupling to an antenna coil of a communication counterpart is increased. Note that, even in a case where the first coil end P1 is in proximity to a central portion of the first planar conductor 11, the coil antenna 20 and the first planar conductor 11 undergo electromagnetic-field coupling, and the first planar conductor 11 therefore defines and functions as a booster antenna for the coil antenna 20.

The antenna device 101 according to the first preferred embodiment has a structure such that the second coil end P2 is in proximity (adjacent) to the edge portion of the second planar conductor 12 where the density of currents generated is high because of an edge effect. Thus, the coil antenna 20 and the second planar conductor 12 undergo electromagnetic-field coupling with high efficiency. Therefore, the function of the second planar conductor 12 as a booster antenna is improved, and the degree of coupling to an antenna coil of a communication counterpart is increased. Note that, even in a case where the second coil end P2 is in proximity to a central portion of the second planar conductor 12, the coil antenna 20 and the second planar conductor 12 undergo electromagnetic-field coupling, and the second planar conductor 12 therefore defines and functions as a booster antenna for the coil antenna 20.

In the antenna device 101 according to the first preferred embodiment, the first planar conductor 11 and the second planar conductor 12 are longer than the coil antenna 20 in the longitudinal direction (the Y direction in FIG. 2A). The larger areas the first planar conductor 11 and the second planar conductor 12 have, the more the functions of the first planar conductor 11 and the second planar conductor 12 as booster antennas are improved. Furthermore, the larger areas the first planar conductor 11 and the second planar conductor 12 have, the greater the number of lines of the magnetic flux φ2 the first planar conductor 11 and the second planar conductor 12 receive from the first coil end P1 and from the second coil end P2, respectively.

In the antenna device 101 according to the first preferred embodiment, the first planar conductor 11, the second planar conductor 12, and the third planar conductor 13 extend in substantially one specific plane. Therefore, the first planar conductor 11, the second planar conductor 12, and the third planar conductor 13 are able to be easily provided as conductor patterns on one substrate such as a printed circuit board, for example. Furthermore, since no additional planar conductors are necessary, the manufacturing process is simple and relatively inexpensive.

In the antenna device 101 according to the first preferred embodiment, as illustrated in FIG. 2B, the first planar conductor 11 and the second planar conductor 12 each include surfaces extending along (parallel or substantially parallel to) the winding axis AX1 of the coil antenna 20. Thus, currents tend to be induced in a direction in which the currents flowing through the coil conductors 22 are cancelled out (the first planar conductor 11 and the second planar conductor 12 are each strongly coupled to the coil antenna 20). Consequently, the functions of the first planar conductor 11 and the second planar conductor 12 as booster antennas are improved.

While the first preferred embodiment describes an exemplary case where the winding axis AX1 of the coil antenna 20 extends parallel to the surfaces of the first planar conductor 11 and the second planar conductor 12, they do not necessarily need to be exactly parallel to each other. The coil antenna 20 only is preferably structured such that the winding axis AX1 thereof extends along the first planar conductor 11 and the second planar conductor 12. For example, the term "along" used herein refers to a state where the winding axis AX1 of the coil conductors 22 is at an angle within a range from about −45° to about +45° with respect to a line perpendicular to the first planar conductor 11 and the second planar conductor 12. This also applies to other preferred embodiments of the present invention described below.

In addition, the term "in proximity" used herein is not limited to being used only to describe a position that is very close to the first planar conductor 11 or to the second planar conductor 12. The term "in proximity" is used to describe a position in a range where the first planar conductor 11 or the second planar conductor 12 is able to undergo electromagnetic-field coupling to the coil antenna 20 and, thus, produce a boost effect. For example, when the distance (D1) between the coil antenna 20 and the first planar conductor 11 or the second planar conductor 12 is shorter than or equal to the distance (D2) between the first planar conductor 11 and the second planar conductor 12, the coil antenna 20 is considered to be in proximity to the first planar conductor 11 or the second planar conductor 12 (D1≤D2).

Second Preferred Embodiment

Figure 6A:
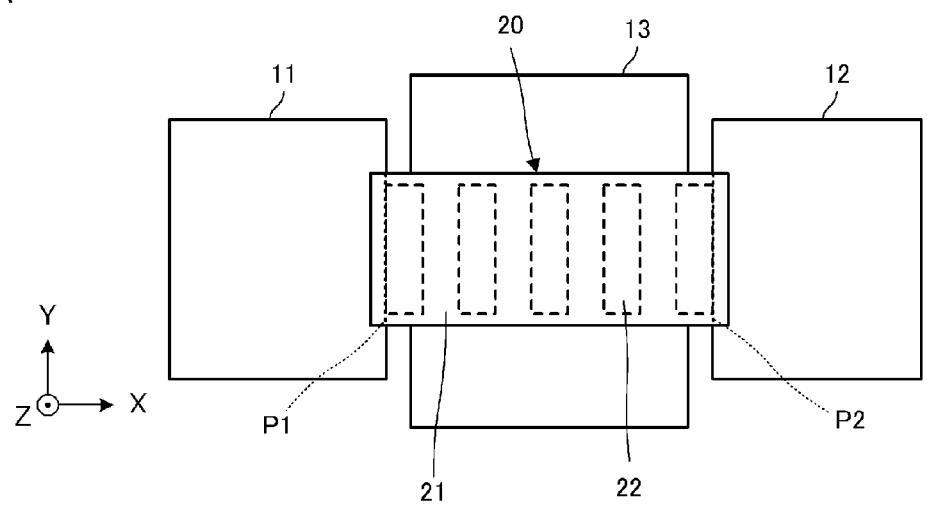
FIG. 6A is a plan view of an antenna device 102 according to a second preferred embodiment of the present invention.
Figure 6B:
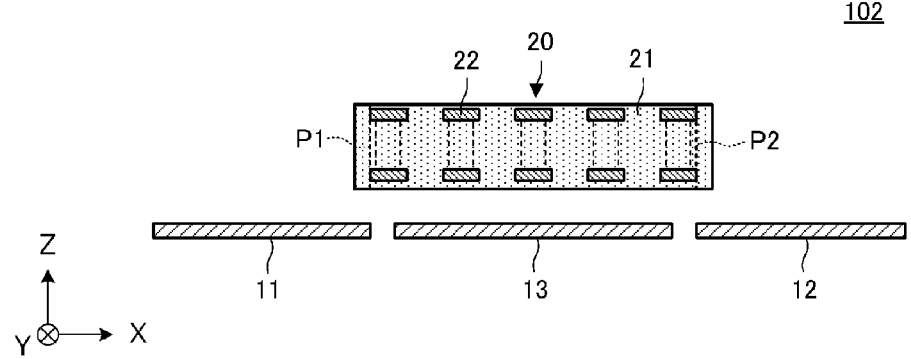
FIG. 6B is a sectional view of the antenna device 102.

FIG. 6A is a plan view of an antenna device 102 according to a second preferred embodiment of the present invention. FIG. 6B is a sectional view of the antenna device 102.

The antenna device 102 according to the second preferred embodiment differs from the antenna device 101 in the positions of the first planar conductor 11 and the second planar conductor 12 relative to the coil antenna 20. The antenna device 102 also differs from the antenna device 101 in the shape of the third planar conductor 13. The other details of the antenna device 102 are the same or substantially the same as those of the antenna device 101 according to the first preferred embodiment.

The differences from the antenna device 101 according to the first preferred embodiment will now be described.

As illustrated in FIG. 6A, the first coil end P1 of the coil antenna 20 is aligned or substantially aligned with the edge portion of the first planar conductor 11 (the right side of the first planar conductor 11 in FIG. 6A) in plan view. Furthermore, the second coil end P2 of the coil antenna 20 is aligned or substantially aligned with the edge portion of the second planar conductor 12 (the left side of the second planar conductor 12 in FIG. 6A) in plan view.

As illustrated in FIG. 6A, the third planar conductor 13 is longer than both of the first planar conductor 11 and the second planar conductor 12 in the lateral (X) direction.

Such a configuration of the antenna device 102 is substantially the same as the configuration of the antenna device 101 according to the first preferred embodiment, and the antenna device 102 provides the same or substantially the same functions and produces the same or substantially the same advantageous effects as the antenna device 101 does.

Third Preferred Embodiment

Figure 7A:
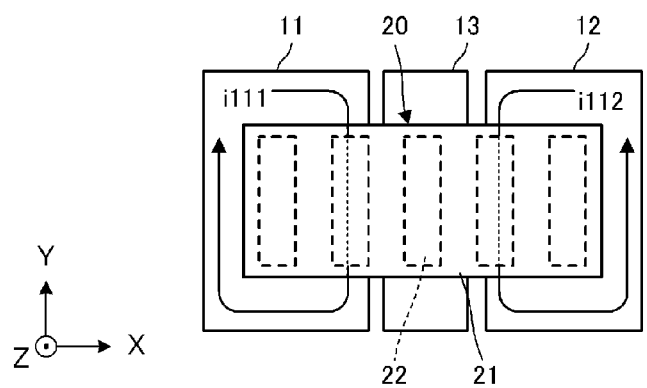
FIG. 7A is a plan view of an antenna device 103 according to a third preferred embodiment of the present invention.
Figure 7B:
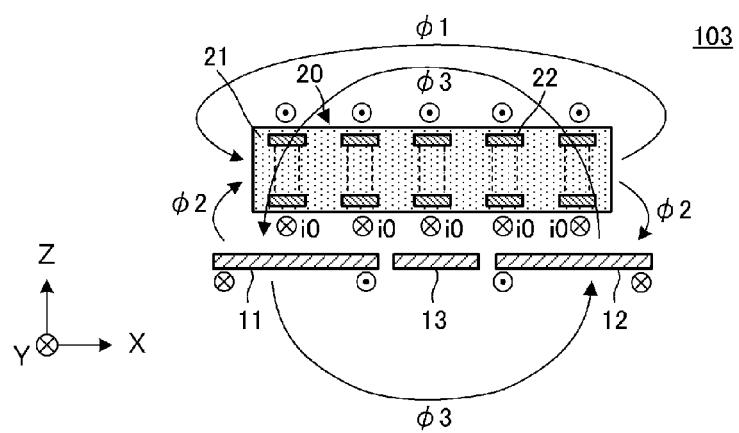
FIG. 7B is a sectional view of the antenna device 103.

FIG. 7A is a plan view of an antenna device 103 according to a third preferred embodiment of the present invention. FIG. 7B is a sectional view of the antenna device 103.

The antenna device 103 according to the third preferred embodiment differs from the antenna device 101 according to the first preferred embodiment in the positions of the first planar conductor 11 and the second planar conductor 12 relative to the coil antenna 20. The other details of the antenna device 103 are the same or substantially the same as those of the antenna device 101 according to the first preferred embodiment.

The differences from the antenna device 101 according to the first preferred embodiment will now be described.

The first coil end P1 of the coil antenna 20 is in proximity (adjacent) to an edge portion of the first planar conductor 11 (the left side of the first planar conductor 11 in FIG. 7A) in plan view. The second coil end P2 of the coil antenna 20 is in proximity (adjacent) to an edge portion of the second planar conductor 12 (the right side of the second planar conductor 12 in FIG. 7A) in plan view.

When currents i0 flow through the respective coil conductors 22 of the coil antenna 20, any of the currents i0 flowing through the coil conductors 22 induce a current i111 in the first planar conductor 11. Specifically, while some of the coil conductors 22 are positioned in proximity to a first edge portion (the right side of the first planar conductor 11 in FIG. 7A) and a second edge portion (the left side of the first planar conductor 11 in FIG. 7A), respectively, of the first planar conductor 11, the first edge portion is in closer proximity to the corresponding coil conductor 22 (faces a larger portion of the coil conductor 22). Thus, a current i111 (an image current) that flows in a direction (the clockwise direction in FIG. 7A) in which the currents i0 are cancelled out is generated at the first edge portion of the first planar conductor 11.

Meanwhile, any of the currents i0 flowing through the coil conductors 22 induce a current i112 in the second planar conductor 12. Specifically, while some of the coil conductors 22 are positioned in proximity to a first edge portion (the left side of the second planar conductor 12 in FIG. 7A) and a second edge portion (the right side of the second planar conductor 12 in FIG. 7A), respectively, of the second planar conductor 12, the first edge portion is in closer proximity to the corresponding coil conductor 22 (faces a larger portion of the coil conductor 22). Thus, a current i112 (an image current) that flows in a direction (the counterclockwise direction in FIG. 7A) in which the currents i0 are cancelled out is generated in the second planar conductor 12.

Furthermore, the magnetic flux φ2 generated by the currents i0 flowing through the coil conductors 22 generates a current that is superposed on (added to) the current i111 in the first planar conductor 11 and a current that is superposed on (added to) the current i112 in the second planar conductor 12.

As illustrated in FIG. 7B, the current i111 generated in the first planar conductor 11 and the current i112 generated in the second planar conductor 12 generates a magnetic flux φ3. The magnetic flux φ3 includes magnetic flux leaving the other major surface (the upper surface in FIG. 7B) of the first planar conductor 11 and entering the other major surface (the upper surface in FIG. 7B) of the second planar conductor 12, and magnetic flux leaving the one major surface (the lower surface in FIG. 7B) of the second planar conductor 12 and entering the one major surface (the lower surface in FIG. 7B) of the first planar conductor 11.

The antenna device 103 configured as described above provides the same or substantially the same functions and produces the same or substantially the same advantageous effects as the antenna device 101 according to the first preferred embodiment does.

Fourth Preferred Embodiment

Figure 8A:
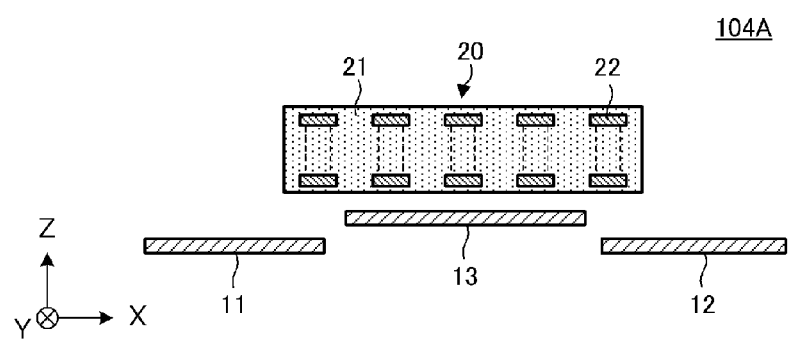
FIG. 8A is a sectional view of an antenna device 104A according to a fourth preferred embodiment of the present invention.
Figure 8B:
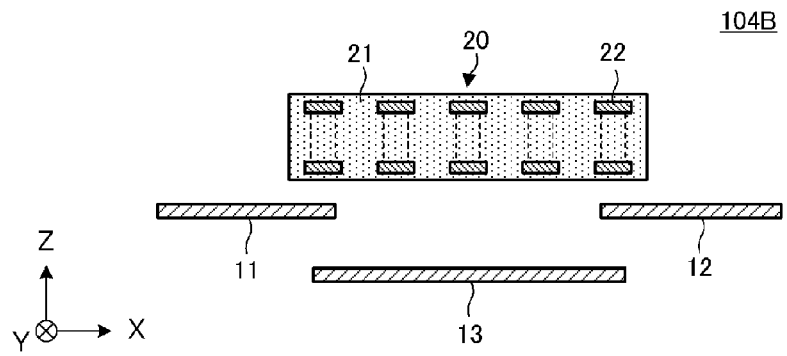
FIG. 8B is a sectional view of another antenna device 104B according to the fourth preferred embodiment of the present invention.

FIG. 8A is a sectional view of an antenna device 104A according to a fourth preferred embodiment of the present invention. FIG. 8B is a sectional view of another antenna device 104B according to the fourth preferred embodiment of the present invention.

The antenna device 104A illustrated in FIG. 8A differs from the antenna device 101 according to the first preferred embodiment in the positions of the first planar conductor 11, the second planar conductor 12, and the third planar conductor 13 in the height (Z) direction. The other details are the same or substantially the same as those of the antenna device 101 according to the first preferred embodiment. Thus, the differences from the antenna device 101 according to the first preferred embodiment will now be described.

The third planar conductor 13 of the antenna device 104A is in closer proximity to the coil antenna 20 than the first planar conductor 11 and the second planar conductor 12.

Such a configuration of the antenna device 104A is substantially the same as the configuration of the antenna device 101 according to the first preferred embodiment, and the antenna device 104A provides the same or substantially the same functions and produces the same or substantially the same advantageous effects as the antenna device 101 does.

The antenna device 104B illustrated in FIG. 8B differs from the antenna device 101 according to the first preferred embodiment in the positions of the first planar conductor 11, the second planar conductor 12, and the third planar conductor 13 in the height (Z) direction and in the length of the third planar conductor 13 in the lateral (X) direction. The other details are substantially the same as those of the antenna device 101 according to the first preferred embodiment. Thus, the differences from the antenna device 101 according to the first preferred embodiment will now be described.

The first planar conductor 11 and the second planar conductor 12 of the antenna device 104B are in closer proximity to the coil antenna 20 than the third planar conductor 13. Furthermore, the length of the third planar conductor 13 in the lateral (X) direction is longer than that of the antenna device 101 according to the first preferred embodiment. At least portions of the third planar conductor 13 of the antenna device 104B overlap the first planar conductor 11 and the second planar conductor 12, respectively, in plan view.

Such a configuration of the antenna device 104B is substantially the same as the configuration of the antenna device 101 according to the first preferred embodiment, and the antenna device 104B provides the same or substantially the same functions and produces the same or substantially the same advantageous effects as the antenna device 101 does.

Moreover, as described in the fourth preferred embodiment, factors such as the position of the third planar conductor 13 in the height (Z) direction and the position and the length of the third planar conductor 13 in the lateral (X) direction may be changed according to need within respective ranges in which the same or substantially the same functions are provided and the same or substantially the same advantageous effects are produced as in the case of the antenna device 101.

Fifth Preferred Embodiment

Figure 9A:
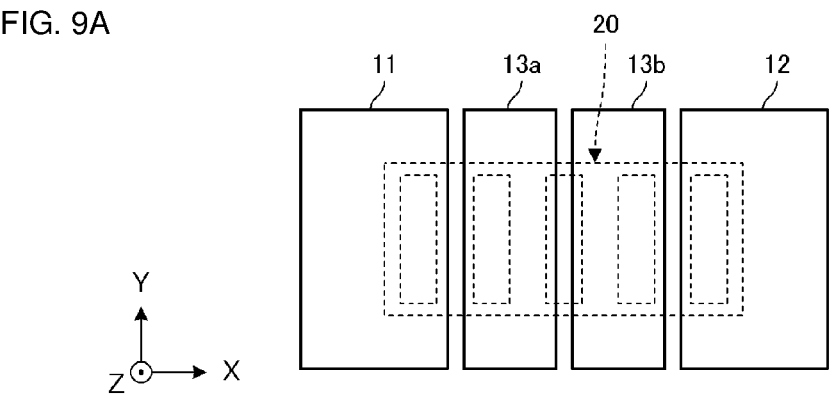
FIG. 9A is a plan view of an antenna device 105A according to a fifth preferred embodiment of the present invention.
Figure 9B:
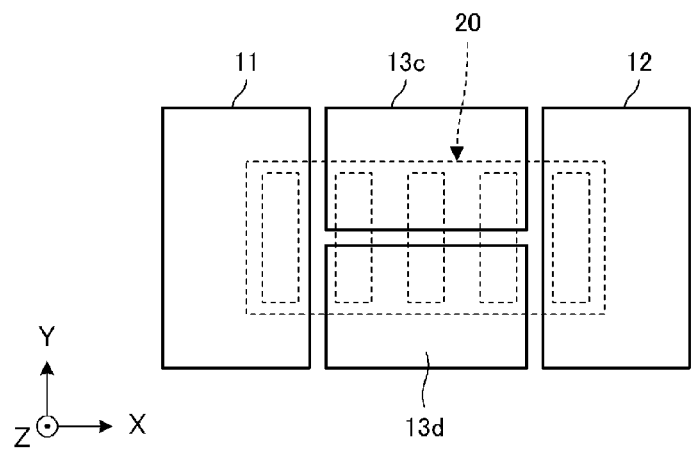
FIG. 9B is a plan view of another antenna device 105B according to the fifth preferred embodiment of the present invention.

FIG. 9A is a plan view of an antenna device 105A according to a fifth preferred embodiment of the present invention. FIG. 9B is a plan view of another antenna device 105B according to the fifth preferred embodiment of the present invention.

The antenna device 105A illustrated in FIG. 9A differs from the antenna device 101 according to the first preferred embodiment in that it includes two third planar conductors. The other details of the antenna device 105A are the same or substantially the same as those of the antenna device 101 according to the first preferred embodiment. Thus, the difference from the antenna device 101 according to the first preferred embodiment will now be described.

The antenna device 105A includes two third planar conductors 13a and 13b. In plan view, the third planar conductors 13a and 13b are located side by side in the lateral (X) direction between the first planar conductor 11 and the second planar conductor 12.

Such a configuration in which the coil antenna 20 is in proximity to the first planar conductor 11 and to the second planar conductor 12 with the third planar conductors 13a and 13b interposed between the first planar conductor 11 and the second planar conductor 12 is substantially the same as the configuration of the antenna device 101 according to the first preferred embodiment. Thus, the antenna device 105A provides the same or substantially the same functions and produces the same or substantially the same advantageous effects as the antenna device 101 does.

In the antenna device 105A according to the fifth preferred embodiment, there are three air gaps in the lateral (X) direction between the first planar conductor 11 and the second planar conductor 12. Thus, compared with the antenna device 101, the occurrence of electromagnetic-field coupling between the first planar conductor 11 and the second planar conductor 12 is reduced or prevented more by the third planar conductors 13a and 13b, and the currents generated in the first planar conductor 11 and in the second planar conductor 12 are prevented from being cancelled out (reduced). Consequently, the deterioration in the functions of the first planar conductor 11 and the second planar conductor 12 as booster antennas is reduced or prevented, and a wide allowable communication range is provided.

The antenna device 105B illustrated in FIG. 9B differs from the antenna device 101 according to the first preferred embodiment in that it includes two third planar conductors. The other details are the same or substantially the same as those of the antenna device 101 according to the first preferred embodiment. Thus, the difference from the antenna device 101 according to the first preferred embodiment will now be described.

The antenna device 105B includes two third planar conductors 13c and 13d. In plan view, the third planar conductors 13c and 13d are arranged side by side in the longitudinal (Y) direction between the first planar conductor 11 and the second planar conductor 12.

Such a configuration in which the coil antenna 20 is in proximity to the first planar conductor 11 and to the second planar conductor 12 with the third planar conductors 13c and 13d interposed between the first planar conductor 11 and the second planar conductor 12 is substantially the same as the configuration of the antenna device 101 according to the first preferred embodiment. Thus, the antenna device 105B provides the same or substantially the same functions and produces the same or substantially the same advantageous effects as the antenna device 101 does.

The antenna device 105B according to the fifth preferred embodiment has a structure such that the two third planar conductors 13c and 13d extend in the longitudinal (Y) direction between the first planar conductor 11 and the second planar conductor 12. Thus, the region of each of the third planar conductors 13c and 13d that is in proximity to (faces) the first planar conductor 11 and the second planar conductor 12 is short. Therefore, the occurrence of electromagnetic-field coupling between the third planar conductor 13c and each of the first planar conductor 11 and the second planar conductor 12 is reduced or prevented, and the occurrence of electromagnetic-field coupling between the third planar conductor 13d and each of the first planar conductor 11 and the second planar conductor 12 is reduced or prevented. Thus, the currents generated in the first planar conductor 11 and in the second planar conductor 12 are prevented from being cancelled out (reduced). Consequently, the deterioration in the functions of the first planar conductor 11 and the second planar conductor 12 as booster antennas is reduced or prevented, and a wide allowable communication range is provided.

While the fifth preferred embodiment describes exemplary antenna devices each preferably including two third planar conductors, the present invention is not limited to such a preferred embodiment. Factors such as the number and the shapes of third planar conductors may be changed according to need.

Sixth Preferred Embodiment

Figure 10A:
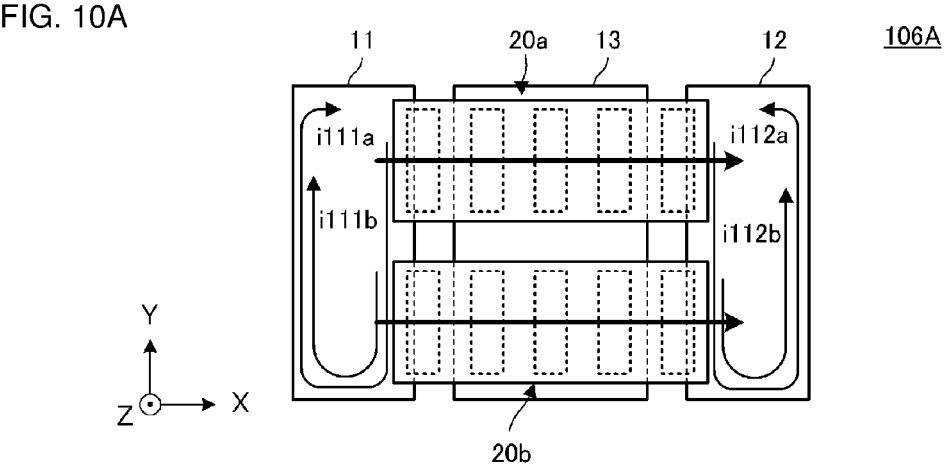
FIG. 10A is a plan view of an antenna device 106A according to a sixth preferred embodiment of the present invention.
Figure 10B:
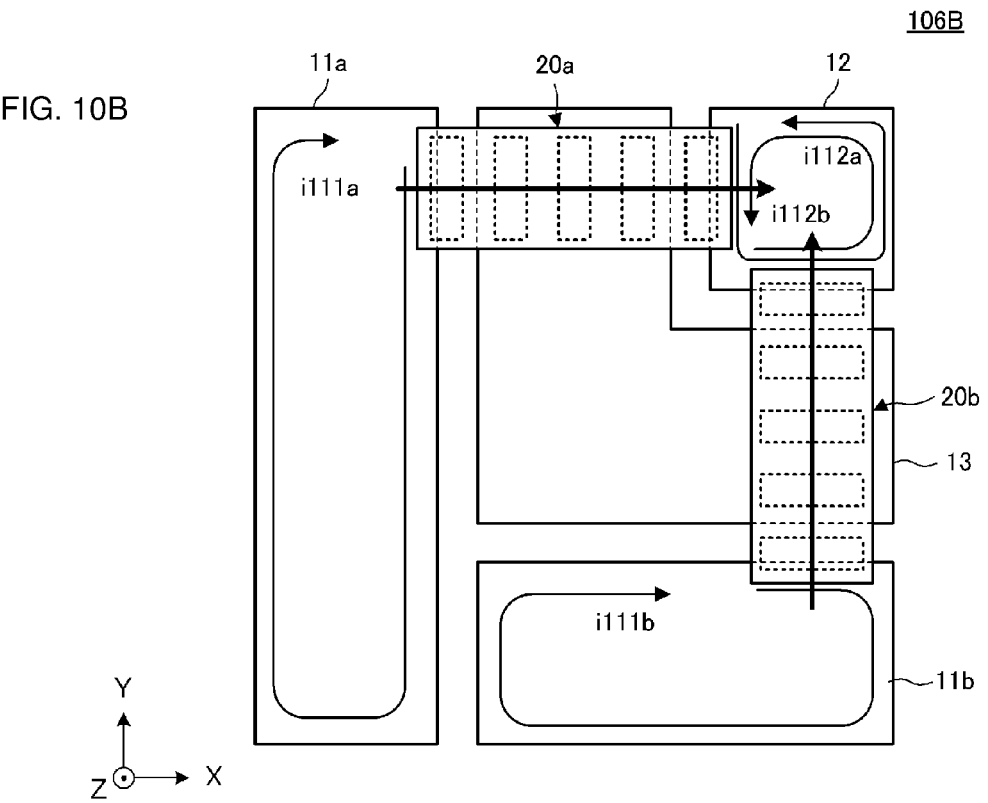
FIG. 10B is a plan view of another antenna device 106B according to the sixth preferred embodiment of the present invention.

FIG. 10A is a plan view of an antenna device 106A according to a sixth preferred embodiment of the present invention. FIG. 10B is a plan view of another antenna device 106B according to the sixth preferred embodiment of the present invention.

The antenna device 106A illustrated in FIG. 10A differs from the antenna device 101 according to the first preferred embodiment in that it includes two coil antennas. The other details of the antenna device 106A are the same or substantially the same as those of the antenna device 101 according to the first preferred embodiment. Thus, the difference from the antenna device 101 according to the first preferred embodiment will now be described.

The antenna device 106A includes two coil antennas 20a and 20b. In plan view, the coil antennas 20a and 20b are arranged side by side in the longitudinal (Y) direction between the first planar conductor 11 and the second planar conductor 12. That is, the coil antennas 20a and 20b are positioned in proximity (adjacent) to the first planar conductor 11 in plan view, and the coil antennas 20a and 20b are also positioned in proximity (adjacent) to the second planar conductor 12 in plan view.

Arrows illustrated in FIG. 10A represent the directions of magnetic-flux flows generated with the same timing (in phase with each other) in the coil antennas 20a and 20b. Specifically, the coil antennas 20a and 20b of the antenna device 106A are connected such that the currents generated in the first planar conductor 11 by an effect of electromagnetic-field coupling are in phase with each other and the currents generated in the second planar conductor 12 by an effect of electromagnetic-field coupling are in phase with each other.

Such a configuration in which the coil antennas 20a and 20b are positioned in proximity to the first planar conductor 11 and to the second planar conductor 12 with the third planar conductor 13 interposed between the first planar conductor 11 and the second planar conductor 12 is substantially the same as the configuration of the antenna device 101 according to the first preferred embodiment. Thus, the antenna device 106A provides the same or substantially the same functions and produces the same or substantially the same advantageous effects as the antenna device 101 does.

Furthermore, since a plurality of coil antennas are provided, the total number of lines of magnetic flux generated from the coil antennas is greater than in the case where only one coil antenna is provided. Accordingly, the function as a booster antenna is improved, and a wide allowable communication range is provided.

The antenna device 106A has a structure such that a current i111a generated in the first planar conductor 11 by an effect of electromagnetic-field coupling to the coil antenna 20a and a current i111b generated in the first planar conductor 11 by an effect of electromagnetic-field coupling to the coil antenna 20b are in phase with each other. Therefore, the currents i111a and i111b generated in the first planar conductor 11 by an effect of electromagnetic-field coupling are superposed (added) together. Consequently, the function of the first planar conductor 11 as a booster antenna is improved, and a wide allowable communication range is provided.

The antenna device 106A has a structure such that a current i112a generated in the second planar conductor 12 by an effect of electromagnetic-field coupling to the coil antenna 20a and a current i112b generated in the second planar conductor 12 by an effect of electromagnetic-field coupling to the coil antenna 20b are in phase with each other. Therefore, the currents i112a and i112b generated in the second planar conductor 12 by an effect of electromagnetic-field coupling to the coil antennas 20a and 20b are superposed (added) together. Consequently, the function of the second planar conductor 12 as a booster antenna is improved, and a wide allowable communication range is provided.

The antenna device 106B illustrated in FIG. 10B differs from the antenna device 106A according to the sixth preferred embodiment in the positions of the coil antennas and in the numbers, shapes, and positions of first, second, and third planar conductors.

The antenna device 106B includes two coil antennas 20a and 20b, two first planar conductors 11a and 11b, a second planar conductor 12, and a third planar conductor 13. The second planar conductor 12 is a square or substantially square thin metal plate. The third planar conductor 13 is preferably an L-shaped thin metal plate extending in the lateral (X) direction and in the longitudinal (Y) direction, and is in proximity (adjacent) to two sides (the left side and the lower side in FIG. 10B) of the second planar conductor 12 that meet (adjoin) each other. The first planar conductor 11a is a rectangular or substantially rectangular thin metal plate extending in the longitudinal (Y) direction. The first planar conductor 11b is a rectangular or substantially rectangular thin metal plate extending in the lateral (X) direction. The first planar conductor 11a is in proximity (adjacent) to one side (the left side in FIG. 10B) of the third planar conductor 13. The first planar conductor 11b is in proximity (adjacent) to another side (the lower side in FIG. 10B) of the third planar conductor 13.

In plan view, the coil antenna 20a is provided between the first planar conductor 11a and the second planar conductor 12, and the coil antenna 20b is provided between the first planar conductor 11b and the second planar conductor 12. That is, the coil antennas 20a and 20b are positioned in proximity (adjacent) to the one second planar conductor 12 in plan view.

Arrows illustrated in FIG. 10B represent the directions of magnetic-flux flows generated with the same timing (in phase with each other) in the coil antennas 20a and 20b. Specifically, in the antenna device 106B, the magnetic flux generated in the coil antenna 20a flows in the lateral (X) direction (the rightward direction in FIG. 10B), and the magnetic flux generated in the coil antenna 20b flows in the longitudinal (Y) direction (the upward direction in FIG. 10B). In other words, the direction of the magnetic flux generated in the coil antenna 20a and the direction of the magnetic flux generated in the coil antenna 20b are perpendicular or substantially perpendicular to each other. The coil antennas 20a and 20b of the antenna device 106B are connected such that the currents generated in the second planar conductor 12 by an effect of electromagnetic-field coupling are in phase with each other.

Such a configuration in which the coil antennas 20a and 20b are positioned in proximity to the first planar conductors 11a and 11b and to the second planar conductor 12 with the third planar conductor 13 interposed between the second planar conductor 12 and each of the first planar conductors 11a and 11b is substantially the same as the configuration of the antenna device 101 according to the first preferred embodiment. Thus, the antenna device 106B provides the same or substantially the same functions and produces the same or substantially the same advantageous effects as the antenna device 101 does.

Furthermore, the antenna device 106B includes two first planar conductors 11a and 11b defining and functioning as booster antennas and, therefore, has a larger coil opening defining and functioning as an antenna than in the case where only one first planar conductor is provided. Thus, the degree of coupling to an antenna coil of a communication counterpart is increased.

Furthermore, the coil antennas 20a and 20b of the antenna device 106B are positioned in proximity (adjacent) to the one second planar conductor 12, and the direction in which the magnetic flux generated in the coil antenna 20a flows and the direction in which the magnetic flux generated in the coil antenna 20b flows are perpendicular or substantially perpendicular to each other. In such a configuration, the magnetic flux generated in the antenna device 106B is able to have directivity in one specific direction (a direction toward the upper right in FIG. 10B).

The antenna device 106B has a structure such that a current i112a generated in the second planar conductor 12 by an effect of electromagnetic-field coupling to the coil antenna 20a and a current i112b generated in the second planar conductor 12 by an effect of electromagnetic-field coupling to the coil antenna 20b are in phase with each other. Therefore, the currents i112a and i112b generated in the second planar conductor 12 by an effect of electromagnetic-field coupling to the coil antennas 20a and 20b are superposed (added) together. Consequently, the function of the second planar conductor as a booster antenna is improved, and a wide allowable communication range is provided.

While the coil antennas 20a and 20b of the antenna device 106B are connected such that the currents i112a and i112b generated in the second planar conductor 12 by an effect of electromagnetic-field coupling are in phase with each other, the present invention is not limited to such a configuration. The first planar conductor may have a rectangular, a substantially rectangular, or an L shape in plan view, and two coil antennas may be connected such that the currents generated in the first planar conductor by an effect of electromagnetic-field coupling are in phase with each other.

The configurations discussed in the above preferred embodiments are only exemplary, and the present invention is not limited thereto. The shapes, the numbers, the positions, and other factors of the first, second, and third planar conductors and the numbers, the positions, and other factors of the coil antennas may be changed according to need and within the range that satisfies any of the above configurations.

Furthermore, as long as a plurality of coil antennas are connected such that the currents generated in one first planar conductor 11 or in one second planar conductor 12 by an effect of electromagnetic-field coupling are in phase with each other, the plurality of coil antennas may be connected either in series or in parallel. If the antenna device includes three or more coil antennas, some of the coil antennas may be connected in series while the others may be connected in parallel. If a plurality of coil antennas are connected in series, the total inductance of the coil antennas is increased. If a plurality of coil antennas are connected in parallel, the resistance component of the coils is reduced. Thus, the conductor loss of the coils is reduced.

Seventh Preferred Embodiment

Figure 11A:
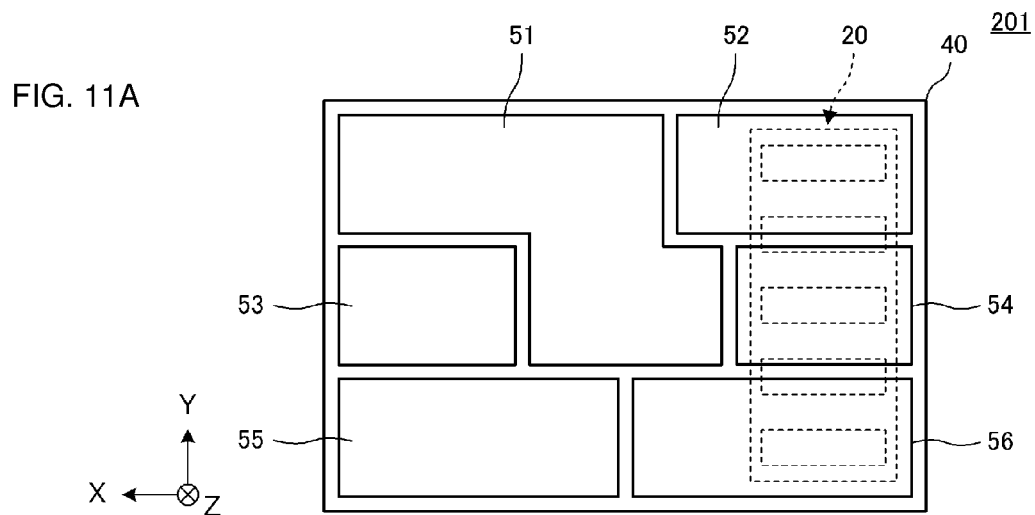
FIG. 11A is a plan view of a card-type information medium 201 according to a seventh preferred embodiment of the present invention.
Figure 11B:
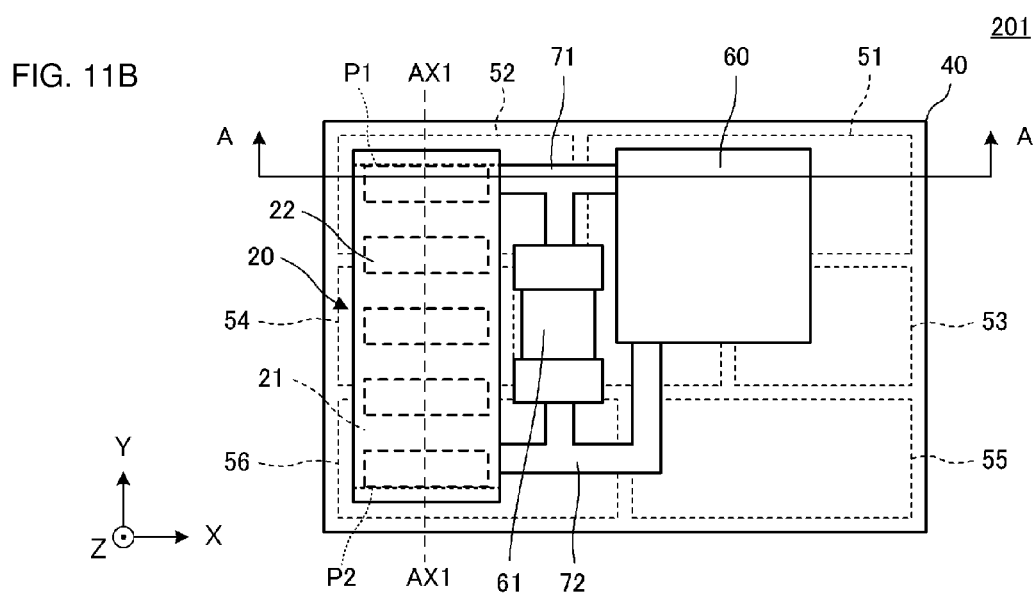
FIG. 11B is a bottom view of the card-type information medium 201.
Figure 11C:
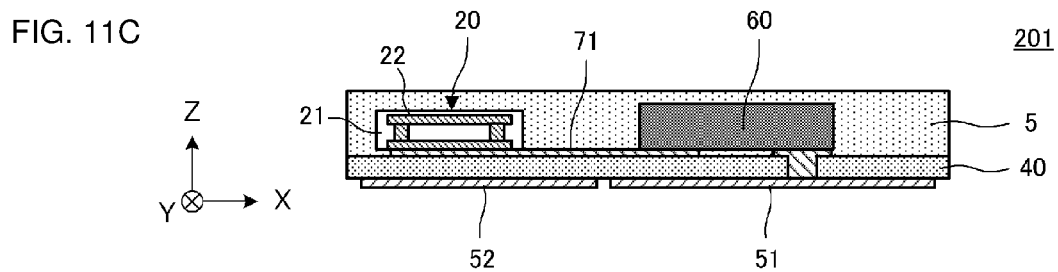
FIG. 11C is a sectional view taken along line A-A illustrated in FIG. 11B.

FIG. 11A is a plan view of a card-type information medium 201 according to a seventh preferred embodiment of the present invention. FIG. 11B is a bottom view of the card-type information medium 201. FIG. 11C is a sectional view taken along line A-A illustrated in FIG. 11B. In FIG. 11B, the sealing resin 5 is not illustrated. For easy understanding of the drawings and the theory, the illustration of the card-type information medium 201 in FIGS. 11A-11C is simplified.

The card-type information medium 201 includes a substrate 40, wire-conductor patterns 71 and 72, an RFIC device 60, a coil antenna 20, a chip capacitor 61, a sealing resin 5, and electrodes 51, 52, 53, 54, 55, and 56. The card-type information medium 201 is, for example, a SIM (a registered trademark) card (a Subscriber Identity Module card, such as a mini-SIM, a micro-SIM, and a nano-SIM) that utilizes electrodes for external connection as the first, second, and third planar conductors. In the card-type information medium 201 according to the seventh preferred embodiment, the electrode 52 corresponds to the first planar conductor, the electrode 56 corresponds to the second planar conductor, and the electrode 54 corresponds to the third planar conductor.

The substrate 40 preferably is a rectangular or substantially rectangular flat plate made of an insulating material, such as resin, for example. The wire-conductor patterns 71 and 72 are disposed on one of the major surfaces of the substrate (the upper surface in FIG. 11B). The wire-conductor patterns 71 and 72 are, for example, patterns of Cu foil that are formed by etching or other suitable process. The card-type information medium 201 may include a cut (not illustrated) so that the orientation of the card-type information medium 201 can be checked.

One end of each of the wire-conductor patterns 71 and 72 is connected to the RFIC device 60, in which an RFIC chip (a bare chip) is packaged. As illustrated in FIG. 11B, the RFIC device 60 is mounted on the one major surface of the substrate 40. The RFIC device 60 may be a bare-chip RFIC. In that case, the RFIC preferably includes an Au electrode terminal and is ultrasonically joined to an Au plating film included in each of the wire-conductor patterns 71 and 72.

The other end of each of the wire-conductor patterns 71 and 72 is connected to the coil antenna 20. More specifically, the wire-conductor pattern 71 is connected to one of the coil conductors 22 that is nearest to the first coil end P1 of the coil antenna 20, and the wire-conductor pattern 72 is connected to another one of the coil conductors 22 that is nearest to the second coil end P2 of the coil antenna 20. As with the RFIC device 60, the chip capacitor 61 is connected to the wire-conductor patterns 71 and 72 and is mounted on the one major surface of the substrate 40.

The coil antenna 20 is in proximity to one side (the left side in FIG. 11B) of the substrate 40 with the winding axis AX1 of the coil conductors 22 extending along the one side of the substrate 40. As illustrated in plan view in FIG. 11B, the first coil end P1 of the coil antenna 20 is in proximity (adjacent) to an edge portion of the electrode 52 corresponding to the first planar conductor, and the second coil end P2 of the coil antenna 20 is in proximity (adjacent) to an edge portion of the electrode 56 corresponding to the second planar conductor.

The sealing resin 5 is provided over substantially the entirety of the one major surface of the substrate 40. Therefore, the wire-conductor patterns 71 and 72, the RFIC device 60, the coil antenna 20, and the chip capacitor 61 are embedded in the sealing resin 5 as illustrated in FIG. 11C. The sealing resin 5 protects the RFIC device 60, the chip capacitor 61, the coil antenna 20, and other associated elements from external impacts, forces, and other environmental factors. With the sealing resin 5, the reliability in the electrical connection between each of the RFIC device 60, the chip capacitor 61, and the coil antenna 20 and each of the wire-conductor patterns 71 and 72 is improved, and the mechanical strength of the card-type information medium 201 is increased. While the seventh preferred embodiment describes an exemplary case where the sealing resin 5 is provided over substantially the entirety of the one major surface of the substrate 40, the present invention is not limited to such a case. The number, the shape, the size, and other factors of the sealing resin 5 may be changed according to need.

The electrodes 51 to 56 are preferably each a flat thin metal plate and are provided on the other major surface (the lower surface in FIG. 11C) of the substrate 40. The electrodes 51 to 56 are preferably electrodes for an external connection that is established by contact communication and are each preferably made of, for example, Cu foil whose surface is plated with Ni/Au or other suitable material. The electrodes 51 to 56 are each connected to and, thus, electrically continuous with the RFIC device 60 with a via conductor, or a conductor such as an interlayer connection conductor or a piece of bonding wire provided in the substrate 40.

In such a configuration, the coil antenna 20 is connected to the RFIC device 60 while being connected in parallel with the chip capacitor 61. The coil antenna 20, the chip capacitor 61, and a capacitance component of the RFIC device 60 define an LC resonance circuit. The capacitance of the chip capacitor 61 is determined such that the resonant frequency of the LC resonance circuit becomes equal or substantially equal to the communication frequency of the RFID system (for example, 13.56 MHz). A plurality of capacitors may be provided to set the resonant frequency.

Such a configuration in which the coil antenna 20 is in proximity to the first planar conductor and to the second planar conductor with the third planar conductor interposed between the first planar conductor and the second planar conductor is substantially the same as the configuration of the antenna device 101 according to the first preferred embodiment. Thus, the card-type information medium 201 provides the same or substantially the same functions and produces the same or substantially the same effects as the antenna device 101 does.

In the card-type information medium 201 according to the seventh preferred embodiment, since electrodes and other associated elements included in a SIM (a registered trademark) card are used, the first planar conductor, the second planar conductor, and the third planar conductor can be easily obtained. Moreover, since no additional planar conductors are necessary, the manufacturing process is simple and relatively inexpensive. While the seventh preferred embodiment describes an exemplary case where all of the first planar conductor, the second planar conductor, and the third planar conductor are obtained by using electrodes and other associated elements included a SIM (a registered trademark) card, the present invention is not limited to such a case.

Furthermore, the card-type information medium 201 is capable of not only non-contact near-field radio communication but also communication by physical contact of the electrodes 51 to 56 thereof with electrodes of a communication counterpart (the side of a card reader/writer). While the seventh preferred embodiment describes a case where six electrodes are provided, the present invention is not limited to such a case. The number, the shape, and other factors of electrodes may be changed according to need.

Eighth Preferred Embodiment

Figure 12A:
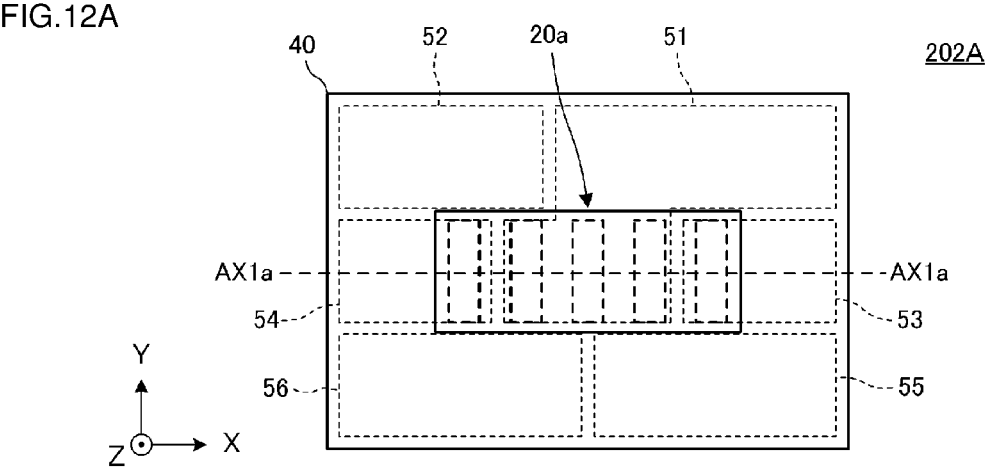
FIG. 12A is a bottom view of a card-type information medium 202A according to an eighth preferred embodiment of the present invention.
Figure 12B:
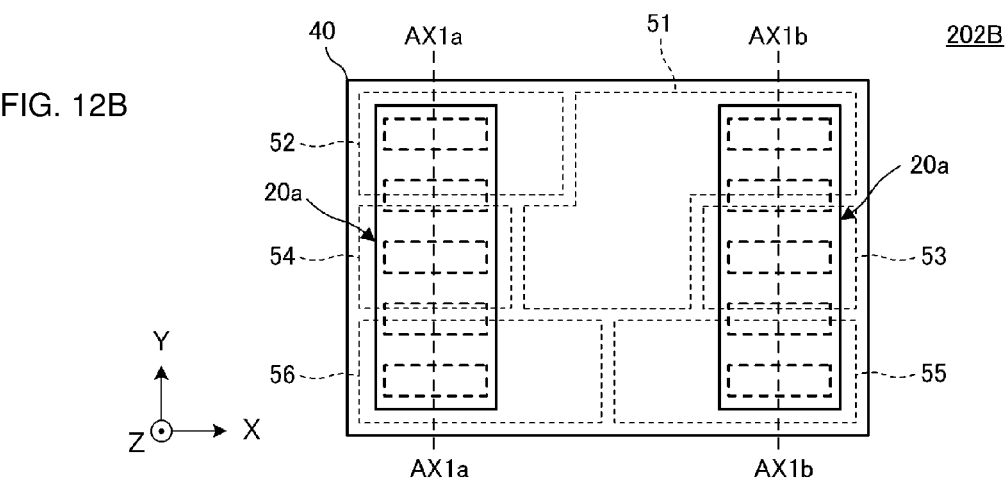
FIG. 12B is a bottom view of another card-type information medium 202B according to an eighth preferred embodiment of the present invention.
Figure 12C:
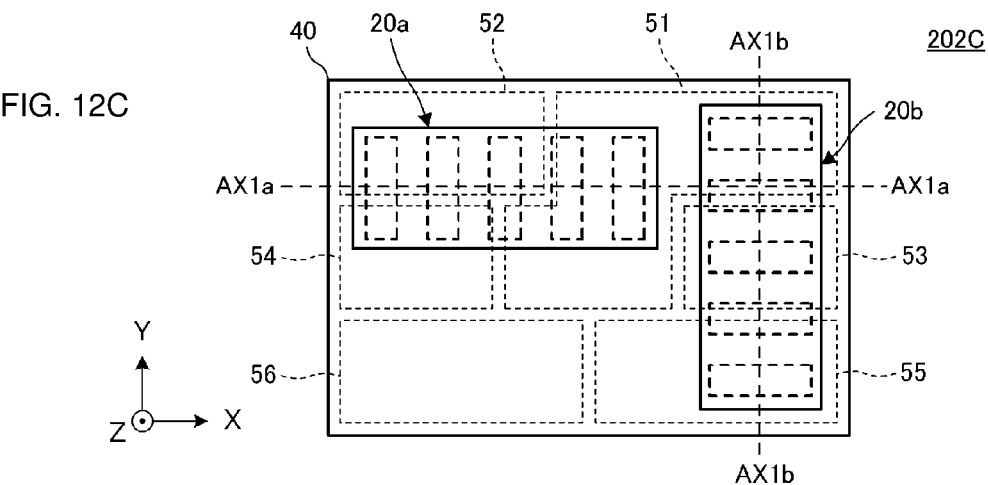
FIG. 12C is a bottom view of yet another card-type information medium 202C according to an eighth preferred embodiment of the present invention.

FIG. 12A is a bottom view of a card-type information medium 202A according to an eighth preferred embodiment of the present invention. FIG. 12B is a bottom view of another card-type information medium 202B according to the eighth preferred embodiment of the present invention. FIG. 12C is a bottom view of yet another card-type information medium 202C according to the eighth preferred embodiment of the present invention. In FIG. 12, the sealing resin is not illustrated. For easy understanding of the drawings and the theory, the illustration of the card-type information media in FIG. 12 is simplified.

The card-type information medium 202A illustrated in FIG. 12A differs from the card-type information medium 201 according to the seventh preferred embodiment in the position of the coil antenna 20a but is the same or substantially the same as the card-type information medium 201 in the other details. Thus, the differences from the card-type information medium 201 will now be described.

The coil antenna 20a of the card-type information medium 202A is positioned near the center of the substrate 40 with a winding axis AX1a of coil conductors 22a extending along one side (the upper or lower side in FIG. 12A) of the substrate 40. In the card-type information medium 202A, the electrode 54 corresponds to the first planar conductor, the electrode 53 corresponds to the second planar conductor, and the electrode 51 corresponds to the third planar conductor.

Such a configuration also provides the same or substantially the same functions and produces the same or substantially the same advantageous effects as the card-type information medium 201 according to the seventh preferred embodiment does.

The card-type information medium 202B illustrated in FIG. 12B differs from the card-type information medium 201 according to the seventh preferred embodiment in that it includes another coil antenna 20b but is the same or substantially the same as the card-type information medium 201 in the other details. Thus, the difference from the card-type information medium 201 will now be described.

The coil antenna 20b of the card-type information medium 202B is in proximity to one side (the right side in FIG. 12B) of the substrate 40 with a winding axis AX1b of coil conductors 22b extending along the one side of the substrate 40. In the card-type information medium 202B, regarding the coil antenna 20a, the electrode 52 corresponds to the first planar conductor, the electrode 56 corresponds to the second planar conductor, and the electrode 54 corresponds to the third planar conductor. Furthermore, regarding the coil antenna 20b, the electrode 51 corresponds to the first planar conductor, the electrode 55 corresponds to the second planar conductor, and the electrode 53 corresponds to the third planar conductor.

Such a configuration also provides the same or substantially the same functions and produces the same or substantially the same advantageous effects as the card-type information medium 201 according to the seventh preferred embodiment does. Furthermore, the card-type information medium may include a plurality of coil antennas. Thus, the total number of lines of magnetic flux generated from the coil antennas is greater than in the case where only one coil antenna is provided. Accordingly, the function as a booster antenna is improved, and a wide allowable communication range is provided.

The card-type information medium 202B includes, as booster antennas, two electrodes 51 and 52 (first planar conductors) and two electrodes 55 and 56 (second planar conductors). Since a plurality of first planar conductors and a plurality of second planar conductors are provided, the coil opening functioning as an antenna is larger than in a case where only one first planar conductor is provided. Consequently, the degree of coupling to an antenna coil of a communication counterpart is increased.

The card-type information medium 202C illustrated in FIG. 12C differs from the card-type information medium 202B in the position of the coil antenna 20a but is the same or substantially the same as the card-type information medium 202B in the other details. Thus, the difference from the card-type information medium 202B will now be described.

The coil antenna 20a of the card-type information medium 202C is in proximity to one side (the upper side in FIG. 12C) of the substrate 40 with a winding axis AX1a of coil conductors 22a extending along the one side of the substrate 40. In the card-type information medium 202C, regarding the coil antenna 20a, the electrodes 52 and 54 correspond to the first planar conductors, and the electrode 51 corresponds to the second planar conductor. Furthermore, regarding the coil antenna 20b, the electrode 55 corresponds to the first planar conductor, the electrode 51 corresponds to the second planar conductor, and the electrode 53 corresponds to the third planar conductor.

Such a configuration also provides the same or substantially the same functions and produces the same or substantially the same advantageous effects as the card-type information medium 201 according to the seventh preferred embodiment does.

Furthermore, the coil antennas 20a and 20b are positioned in proximity (adjacent) to one electrode 51 (the second planar conductor), and the direction of magnetic flux generated in the coil antenna 20a and the direction of magnetic flux generated in the coil antenna 20b are perpendicular or substantially perpendicular to each other. In such a configuration, the magnetic flux generated in the card-type information medium 202C is able to have directivity in one specific direction, i.e., a direction toward the upper right in FIG. 12C.

The card-type information medium 202C has a structure such that the current generated in the electrode 51 (the second planar conductor) by an effect of electromagnetic-field coupling to the coil antenna 20a and the current generated in the electrode 51 (the second planar conductor) by an effect of electromagnetic-field coupling to the coil antenna 20b are in phase with each other. Therefore, the currents generated in the electrode 51 by an effect of electromagnetic-field coupling to the coil antennas 20a and 20b are superposed (added) together. Consequently, the function of the second planar conductor as a booster antenna is enhanced, and a wide allowable communication range is provided.

The card-type information medium 202C further includes the three electrodes 52, 54, and 55 (first planar conductors) and the electrode 51 (second planar conductor) that define and function as booster antennas. With the plurality of planar conductors, the coil opening that defines and functions as an antenna is larger than in a case where only one planar conductor is provided. Consequently, the degree of coupling to an antenna coil of a communication counterpart is increased.

The configurations discussed in the above-described preferred embodiments are only exemplary, and the present invention is not limited thereto. The numbers, the positions, and other factors of coil antennas and the shapes, the numbers, the sizes, the positions, and other factors of electrodes may be changed according to need, as long as the first to third planar conductors can be provided by using electrodes and other associated elements included in a SIM (a registered trademark) card.

Ninth Preferred Embodiment

Figure 13:
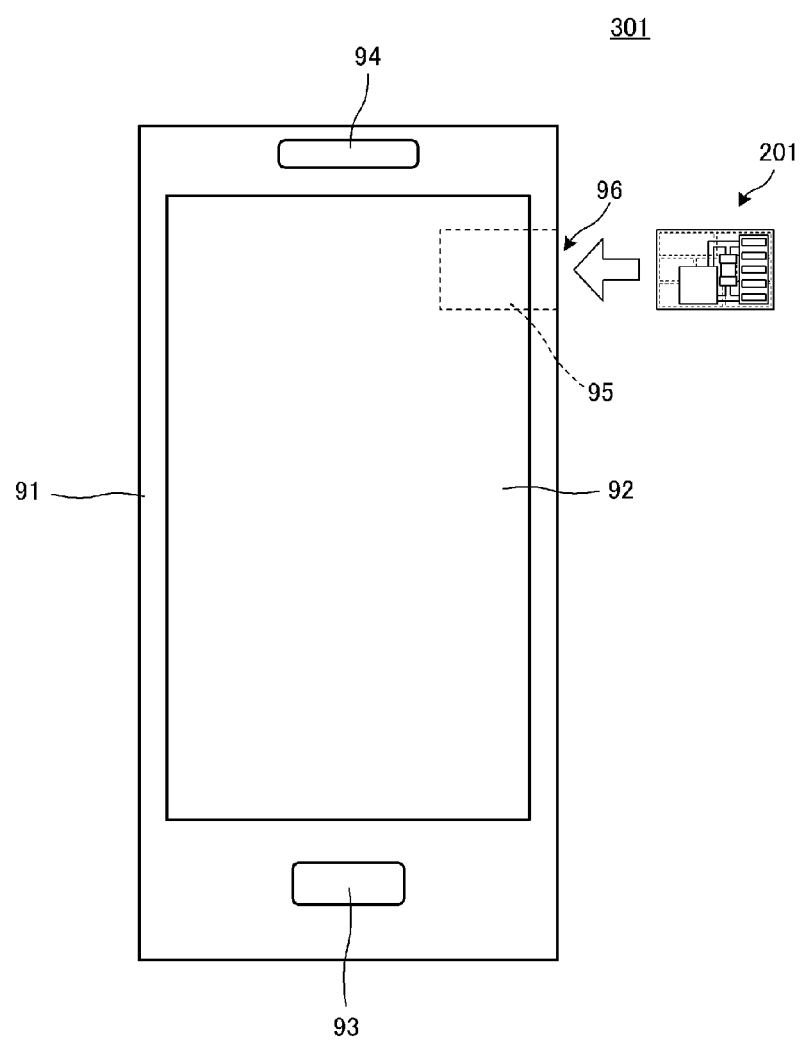
FIG. 13 is a plan view of a communication terminal apparatus 301 according to a ninth preferred embodiment of the present invention.
Figure 14:
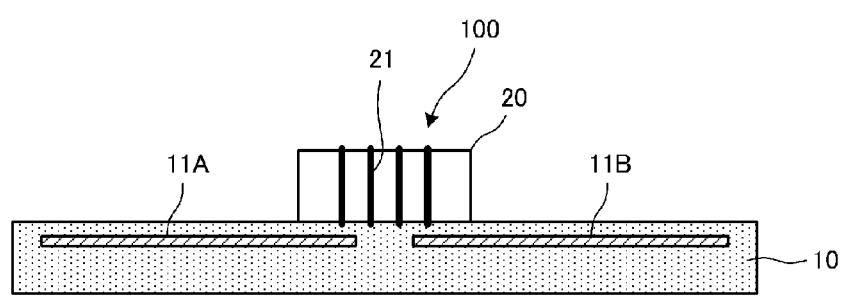
FIG. 14 is a sectional view of an antenna device disclosed by International Publication No. WO 2012/033031.

FIG. 13 is a plan view of a communication terminal apparatus 301 according to a ninth preferred embodiment of the present invention.

The term "communication terminal apparatus" is an apparatus that includes at least one of the antenna device and the card-type information medium described above and a housing, and is any of various electronic apparatuses, for example, cellular phones, such as smart phones and feature phones, wearable terminals, such as smart watches and smart glasses, laptop PCs, tablet terminals, cameras, game apparatuses, toys, and information media, such as IC tags, SD (Secure Digital, a registered trademark) cards, and IC cards.

The communication terminal apparatus 301 preferably includes a housing 91 and the card-type information medium 201. The housing 91 preferably includes a display 92, a button portion 93, and a speaker portion 94. The communication terminal apparatus 301 is preferably an apparatus, such as a cellular phone, a PDA, a smart phone, or a tablet terminal, for example.

The communication terminal apparatus 301 includes the housing 91 and the card-type information medium 201. The housing 91 includes a slot 96 and a receiving portion 95. The card-type information medium 201 is inserted into the slot 96 of the housing 91 and is received by the receiving portion 95. That is, the card-type information medium 201 is housed in the housing 91.

According to the ninth preferred embodiment, the card-type information medium 201 is connected to an internal circuit of the communication terminal apparatus 301 with the aid of electrodes and other associated elements thereof. Note that, alternatively, the card-type information medium 201 may be configured not to be connected to the internal circuit of the communication terminal apparatus 301.

Thus, any apparatus not including an NFC system, but including the card-type information medium is able to function as a communication terminal apparatus that is capable of near-field radio communication.

While the communication terminal apparatus 301 according to the ninth preferred embodiment preferably has a structure such that the card-type information medium 201 is inserted into the slot 96 of the housing 91 and is received by the receiving portion 95, the present invention is not limited to such an apparatus. The slot 96 and the receiving portion 95 are not essential. The card-type information medium 201 preferably is housed in the housing 91.

While the above preferred embodiments describe an exemplary case where the first planar conductor 11, the second planar conductor 12, and the third planar conductor 13 are each a thin metal plate, the present invention is not limited to such a case. The thicknesses of the first planar conductor 11, the second planar conductor 12, and the third planar conductor 13 in the height (Z) direction may be changed according to need.

While the above preferred embodiments describe an exemplary case where the first planar conductor 11, the second planar conductor 12, and the third planar conductor 13 each have a polygonal or L shape in plan view, the present invention is not limited to such a case. The plan-view shape of each of the first planar conductor 11, the second planar conductor 12, and the third planar conductor 13 may be changed according to need to a circular shape, an elliptical shape, or any other suitable shapes.

While the above preferred embodiments each describe an exemplary antenna device, an exemplary card-type information medium, or an exemplary communication terminal apparatus that operates in a HF band intended for NFC, the present invention is not limited to such a case. The present invention may also be applied to an antenna device, a card-type information medium, or a communication terminal apparatus that operates in a UHF band.

While the above preferred embodiments describe an exemplary case where the first planar conductor 11, the second planar conductor 12, and the third planar conductor 13 are not electrically continuous with one another, the present invention is not limited to such a case. The first planar conductor 11, the second planar conductor 12, and the third planar conductor 13 may each be partially continuous with one another. For example, the first planar conductor 11, the second planar conductor 12, and the third planar conductor 13 may be partially connected to one another in the lateral (X) or longitudinal (Y) direction with wire conductors or other suitable structure. Alternatively, the first planar conductor 11, the second planar conductor 12, and the third planar conductor 13 may be partially connected to one another in the height (Z) direction with via conductors or other suitable structure.

While the above preferred embodiments describe an antenna device or a communication terminal apparatus included in a communication system, such as NFC, utilizing the effect of magnetic-field coupling, the antenna device or the communication terminal apparatus according to any of the above preferred embodiments may be applied in the same manner to a non-contact power-transmitting system (based on an electromagnetic-induction method or a magnetic-field-resonance method). The antenna device according to any of the above preferred embodiments may be used as a receiver antenna device of a power-receiving apparatus or a transmitter antenna device of a power-transmitting apparatus included in a magnetic-field-resonance non-contact power-transmitting system that operates in, for example, a HF frequency band (particularly, 6.78 MHz or around 6.78 MHz). Such an antenna device also functions as a power-receiving antenna device or a power-transmitting antenna device. The two ends of each of the coil conductors included in the coil antenna of the antenna device are connected to a power-receiving circuit or a power-transmitting circuit that operates in the frequency band used (an HF band, particularly 6.78 MHz or around 6.78 MHz).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
a coil antenna including an insulator and a coil conductor provided on the insulator, the coil conductor being wound around a winding axis and including a first coil end and a second coil end;
a first planar conductor including a surface extending along or substantially along the winding axis, the first planar conductor being in proximity to the first coil end;
a second planar conductor including a surface extending along or substantially along the winding axis, the second planar conductor being in proximity to the second coil end; and
a third planar conductor positioned in proximity to the first planar conductor and to the second planar conductor, with at least a portion of the third planar conductor being positioned between the first planar conductor and the second planar conductor in plan view of the third planar conductor; wherein
in plan view of the first planar conductor, the first planar conductor is longer than the coil antenna in a second direction that is perpendicular or substantially perpendicular to a first direction in which the winding axis of the coil antenna extends; and
the coil antenna is arranged to be electromagnetic-field coupled to the first and second planar conductors.

2. The antenna device according to claim 1, wherein the first planar conductor, the second planar conductor, and the third planar conductor extend in one plane or substantially one plane.

3. The antenna device according to claim 1, wherein the first coil end is in proximity to an edge portion of the first planar conductor in plan view.

4. The antenna device according to claim 1, wherein the second coil end is in proximity to an edge portion of the second planar conductor in plan view.

5. The antenna device according to claim 1, wherein the third planar conductor includes a plurality of third planar conductors.

6. The antenna device according to claim 1, wherein the coil antenna includes a plurality of coil antennas.

7. The antenna device according to claim 6, wherein the plurality of coil antennas are in proximity to the first planar conductor and are connected such that currents generated in the first planar conductor by electromagnetic-field coupling to the plurality of coil antennas are in phase with each other.

8. The antenna device according to claim 6, wherein the plurality of coil antennas are in proximity to the second planar conductor and are connected such that currents generated in the second planar conductor by electromagnetic-field coupling to the plurality of coil antennas are in phase with each other.

9. A card information medium comprising:
   the antenna device according to claim 1; and
   an external-connection electrode; wherein
   at least one of the first planar conductor, the second planar conductor, and the third planar conductor defines an external-connection conductor.

10. A communication terminal apparatus comprising:
    the card information medium according to claim 9; and
    a housing; wherein
    the card information medium is located in the housing.

11. The antenna device according to claim 1, wherein the coil antenna is spaced away from the first, second, and third planar conductors by an insulator.

\* \* \* \* \*